(12) United States Patent
Subramaniam

(10) Patent No.: US 9,571,332 B2
(45) Date of Patent: Feb. 14, 2017

(54) METHODS AND APPARATUSES FOR REMOTE APPLICATION PROVISIONING AUTOMATION OVER VIRTUALIZED IT INFRASTRUCTURE

(71) Applicant: Karthikeyan Subramaniam, San Jose, CA (US)

(72) Inventor: Karthikeyan Subramaniam, San Jose, CA (US)

(73) Assignee: Adara Networks, Inc., San Jose, CA (US)

( * ) Notice: Subject to any disclaimer, the term of this patent is extended or adjusted under 35 U.S.C. 154(b) by 206 days.

(21) Appl. No.: 13/794,596

(22) Filed: Mar. 11, 2013

(65) Prior Publication Data

US 2013/0275596 A1  Oct. 17, 2013

Related U.S. Application Data

(60) Provisional application No. 61/625,662, filed on Apr. 17, 2012.

(51) Int. Cl.
*G06F 15/173* (2006.01)
*H04L 12/24* (2006.01)
*G06F 9/455* (2006.01)
*H04L 29/08* (2006.01)

(52) U.S. Cl.
CPC ............ *H04L 41/04* (2013.01); *G06F 9/45558* (2013.01); *G06F 2009/45562* (2013.01); *H04L 67/34* (2013.01)

(58) Field of Classification Search
CPC .................. G06F 9/45558; G06F 2009/45562

USPC ............................................... 709/226; 718/1
See application file for complete search history.

(56) References Cited

U.S. PATENT DOCUMENTS

| 7,680,919 | B2 | 3/2010 | Nelson |
| 7,818,410 | B1 | 10/2010 | Barnes et al. |
| 8,095,929 | B1 | 1/2012 | Ji et al. |
| 2008/0300851 | A1 | 12/2008 | Chakrabarti et al. |
| 2009/0228629 | A1* | 9/2009 | Gebhart ................... G06F 8/63 711/6 |
| 2009/0282404 | A1 | 11/2009 | Khandekar et al. |
| 2009/0313620 | A1* | 12/2009 | Sedukhin et al. ............. 718/1 |
| 2010/0191854 | A1 | 7/2010 | Isci et al. |
| 2010/0287263 | A1 | 11/2010 | Liu et al. |

(Continued)

OTHER PUBLICATIONS

FierceWireless, "Verizon to Demonstrate Software Defined Networking Principles With Collaborative Lab Trials", Apr. 17, 2012, 4 pages.

(Continued)

*Primary Examiner* — Wing F Chan
*Assistant Examiner* — Joseph Maniwang
(74) *Attorney, Agent, or Firm* — Blakely, Sokoloff, Taylor & Zafman LLP

(57) ABSTRACT

Methods and apparatuses for remote application provisioning over a virtual machine are described. A request to move an application from a source is received. In response to the request, a target virtual machine for the application is created. The application is moved to the target virtual machine. For an embodiment, the application image is moved and well defined automation is performed to launch the application. For an embodiment, the application is loaded over the template virtual machine, which is available in a target hypervisor.

32 Claims, 15 Drawing Sheets

(56) References Cited

U.S. PATENT DOCUMENTS

| | | |
|---|---|---|
| 2011/0035755 A1 | 2/2011 | Huang et al. |
| 2011/0231784 A1 | 9/2011 | Meng et al. |
| 2012/0054367 A1 | 3/2012 | Ramakrishnan et al. |
| 2012/0260250 A1* | 10/2012 | Maeda et al. .................... 718/1 |
| 2013/0055256 A1* | 2/2013 | Banga et al. .................... 718/1 |
| 2013/0097293 A1* | 4/2013 | Gibson et al. ................ 709/221 |
| 2013/0097597 A1* | 4/2013 | Gibson et al. ................ 717/177 |
| 2014/0040878 A1* | 2/2014 | Mann ........................... 717/174 |

OTHER PUBLICATIONS

PCT Notification of Transmittal of The International Search Report and The Written Opinion of the International Searching Authority, or The Declaration for PCT Counterpart Application No. PCT/US2013/037009 Containing International Search Report, 9 pgs. (Jul. 11, 2013).

PCT Notification Concerning Transmittal of International Preliminary Report on Patentability for PCT Application No. PCT/US2013/037009, 7 pgs. (Oct. 30, 2014).

* cited by examiner

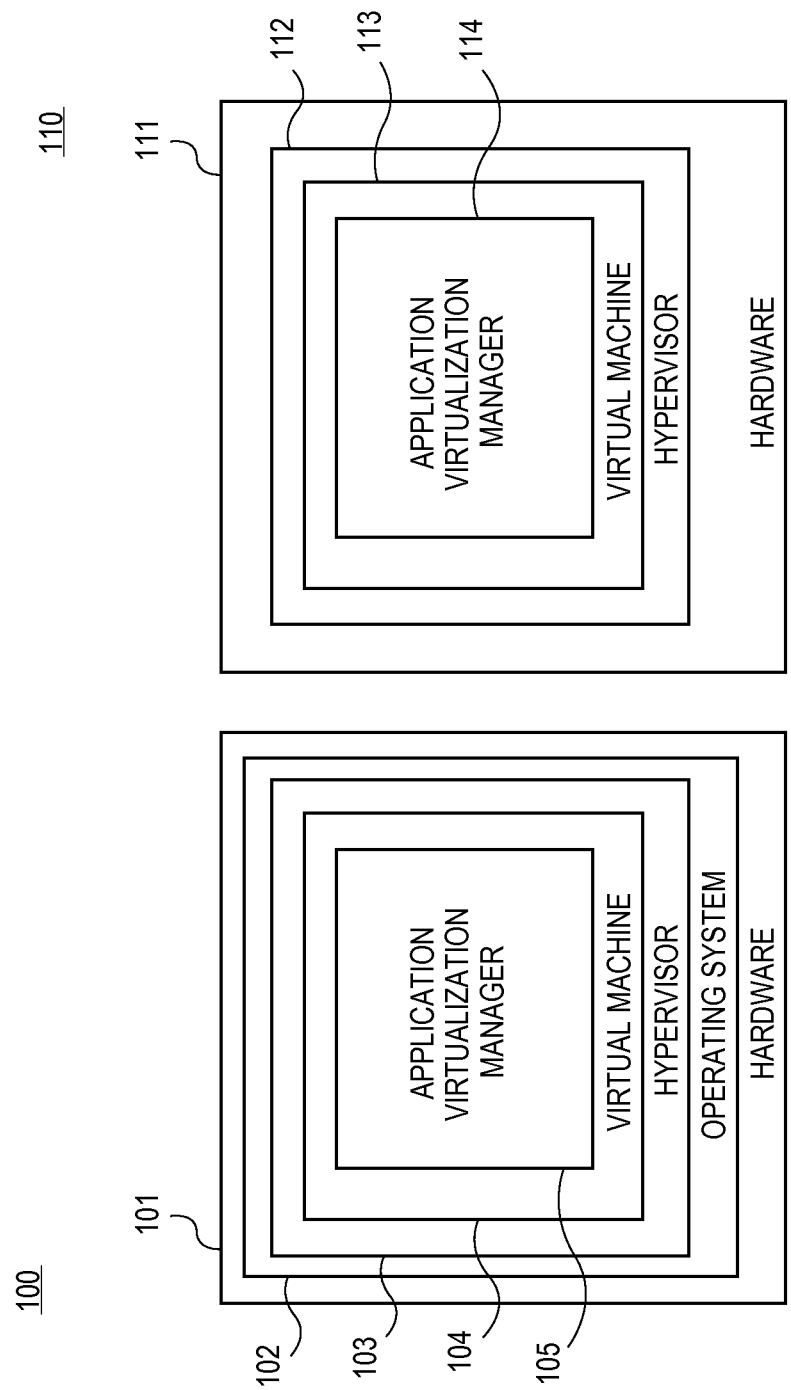

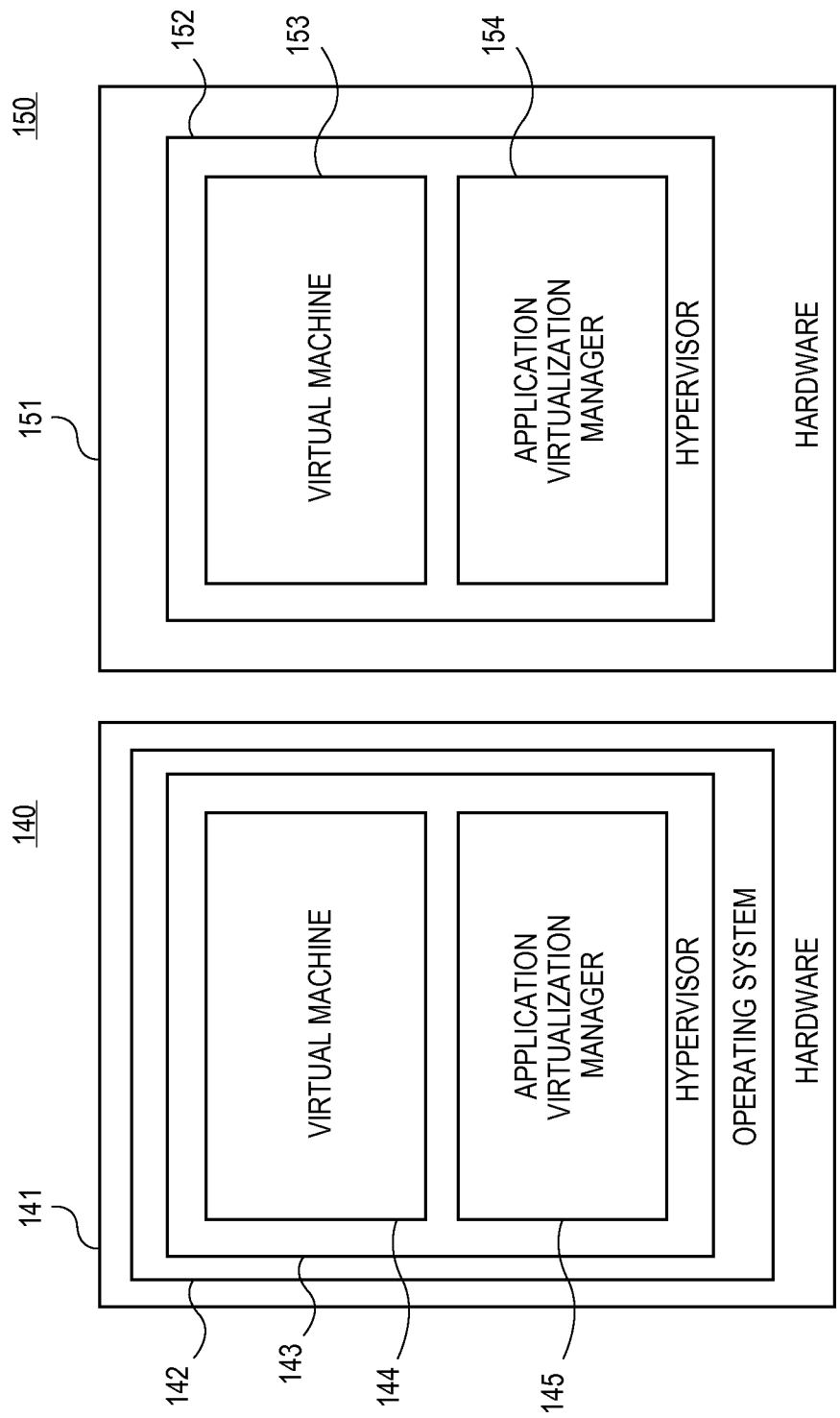

METHODS AND APPARATUSES FOR REMOTE APPLICATION PROVISIONING AUTOMATION OVER VIRTUALIZED IT INFRASTRUCTURE

CROSS REFERENCE TO RELATED APPLICATION

This application claims priority to U.S. Provisional Application No. 61/625,662, filed on Apr. 17, 2012, which is incorporated by reference herein in its entirety.

FIELD

Embodiments as described herein relate generally to computer networks, and more specifically, to virtualization and Information Technology ("IT") infrastructure provisioning automation.

BACKGROUND

Virtualization in computing generally refers to a concept of making one look like many and many look like one. Typically, a hypervisor refers to a special purpose system software that virtualizes multiple operating systems allowing them to share a single hardware host. Traditionally, a single operating system ("OS") runs on the hardware, even though multiple operating systems might have been loaded on its storage. With hypervisors multiple operating systems can run concurrently because the hypervisor abstracts the hardware resources and manages their allocations. The operating systems that run on hypervisors are typically called virtual machines ("VMs") and normally the applications run on virtual machines do not require any modification specific to the hypervisor.

Typically, creating the virtual machines involves a process of loading an operating system image, normally an ISO or a similar file. The operating system image can be a fresh installation media image of the operating system or a snapshot of the running operating system. A virtual machine migration typically refers to a process of moving the OS image file from one hypervisor to another one and booting up the image. In general, cloud computing refers to the use of resources (hardware and software) that are delivered as a service over a computer network, for example, the Internet.

Traditionally, remote application provisioning in the cloud environment is done by creating a snapshot of the whole virtual machine and transferring the snapshot of the virtual machine to a target hypervisor. Snapshot of the virtual machine typically refers to the image file that comprises of the Operating System and Applications. Most of the time Operating system is the major part of the virtual machine snapshot. Creating snapshots, and transferring and loading the huge operating system images typically are time consuming processes. The traditional virtual machine migration uses a huge amount of central processing unit ("CPU"), memory, and disk space resources.

In the cloud data center environments the demand for moving multiple virtual machine images across multiple hypervisors is very high. When the hypervisors are geographically dispersed over a cloud network and the network links between the hypervisors are of low capacity and high latency, the virtual machine migration becomes unreliable, expensive, and time consuming. Because of this, traditional virtual machine migration methodologies require high capacity and low latency network links and have migration distance limitations.

The operating system level provision methods come with the price. The price is paid as part of cost of the image migration and the cost of delay in bringing up the new service. For example, if the fresh installation of operating system uses 4 GB of storage space and application installation consumes 100 Mb of storage space, then the image to be migrated can have the size of 4.1 GB. Over 1.5 Mbps T1 connection it can take 45 minutes. If the carrier charges 1 cent per MB, for example, the total cost of the transfer can be $41 for Operating System VM image transfer.

SUMMARY

Methods and apparatuses for remote application provisioning over a virtual machine ("VM") are described. A request to move an application from a source is received. In response to the request, a target virtual machine for the application is created. The application is moved to the target virtual machine. For an embodiment, the application image is moved and well-defined automation is performed to launch the application. For an embodiment, the application is loaded over the template virtual machine, which is available in a target hypervisor.

Other features as described herein will be apparent from the accompanying drawings and from the detailed description which follows.

BRIEF DESCRIPTION OF DRAWINGS

The embodiments as described herein are illustrated by way of example and not limitation in the figures of the accompanying drawings in which like references indicate similar elements.

FIG. 1A shows an exemplary embodiment of a portion of a data processing system to provide an application provisioning over hypervisors.

FIG. 1B shows another exemplary embodiment of a portion of a data processing system to provide an application provisioning over hypervisors.

FIG. 1E shows another exemplary embodiment of a portion of a data processing system to provide an application provisioning over hypervisors.

FIG. 1F shows another exemplary embodiment of a portion of a data processing system to provide an application provisioning over hypervisors.

DETAILED DESCRIPTION

Figure 1C:
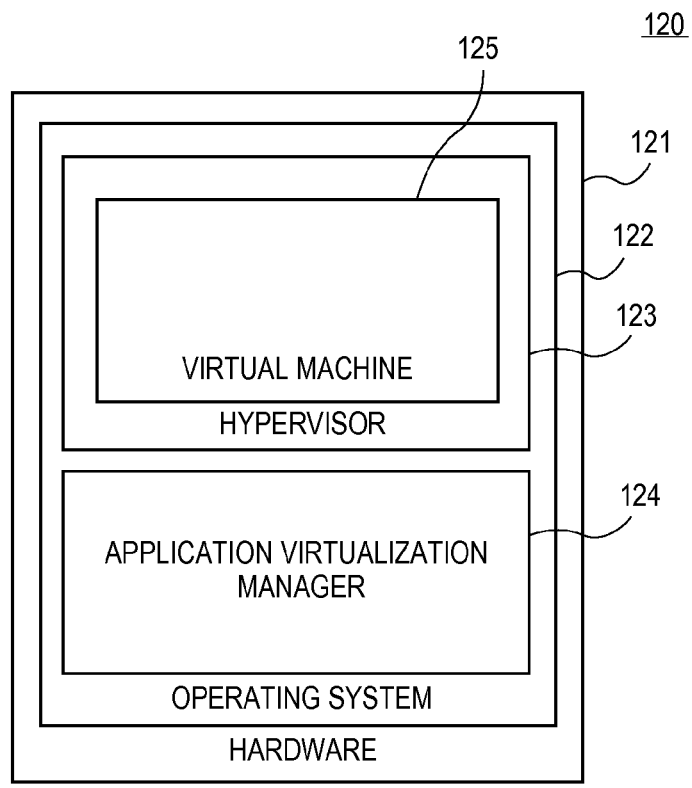
FIG. 1C shows another exemplary embodiment of a portion of a data processing system to provide an application provisioning over hypervisors.

Embodiments as described herein provide remote application provisioning over a virtual machine by moving the application image and performing well defined automation to launch the application instead of moving the whole operating system ("OS") image as part of the VM migration. In the cloud datacenter environment there is a need to bring up the new applications in remote hypervisors and the traditional approach is to transfer the virtual machine image to the target hypervisor and boot up the image. Typically, the entire operating system move is expensive in terms of provisioning time and network bandwidth utilization. The embodiments described herein allow migrating of the application image without the need to transfer the whole virtual machine image. The embodiments described herein allow the loading of the migrated application over a template virtual machine, which is prebuilt and available in the target hypervisor.

FIG. 1A shows an exemplary embodiment of a portion of a data processing system 100 that provides an application provisioning over hypervisors. System 100 includes a hardware 101. For an embodiment, hardware 101 comprises a processor (not shown) coupled to a memory (not shown). An operating system 102 runs on hardware 101. For an embodiment, operating system 102 is a host operating system stored in the memory. A hypervisor 103 runs on operating system 102. Generally, a hypervisor refers to a layer of code in software, firmware, or both that virtualizes the hardware resources and manages their allocations to achieve fine-grained, dynamic resource sharing. For an embodiment, hypervisor 103 is a target hypervisor as described herein.

Hypervisor 103 runs a virtual machine 104. For one embodiment, hypervisor 103 runs virtual machine 104 as a guest. Typically, in a cloud-service environment, a provider can offer computers, e.g., physical machines, virtual machines, or both, and other resources to a user over a network, e.g., the Internet, virtual private networks, other carrier clouds, or a combination thereof. Pools of hypervisors within the cloud system provide support for virtual machines and the ability to scale services according to user requirements. A cloud provider can supply these resources on-demand from their large pools installed in a data center.

As shown in FIG. 1A, an application virtualization manager ("AVM") unit 105 operates over guest virtual machine 104 over the host operating system based hypervisor 103 to perform methods as described herein. The AVM unit is configured to cause the processor to receive a request from a user to move an application from a source system. For an embodiment, the request comprises at least one of an application transport parameter, an application launch parameter; an operating system parameter; a networking parameter; a security parameter, an infrastructure parameter; a provisioning schedule data; and application post-launch validation and notification parameters.

For an embodiment, the AVM unit is configured to cause the processor to create a target virtual machine for the application based on at least one of the parameters. The AVM unit is configured to cause the processor to move the application to the target virtual machine.

The AVM unit causes the processor to move an application image without the need to move an operating system image during remote provisioning and create a new virtual machine on the target hypervisor using well defined automation of application installation and configuration. For at least some embodiments, the application image includes the application packages, dependencies and installation scripts.

For an embodiment, the AVM unit is configured to cause the processor to identify an operating system image for the target virtual machine in a template virtual machine library. The AVM unit is configured to cause the processor to move the operating system image from the template virtual machine library to a target hypervisor.

The AVM unit 105 is configured to cause the processor to configure the target virtual machine and to launch the target virtual machine. The AVM unit is configured to cause the processor to identify application prerequisites in an application prerequisites library to move onto the target virtual machine. The AVM unit is configured to cause the processor to identify the application in an application library to move to the target virtual machine. The AVM unit is configured to cause the processor to configure the application for the target virtual machine.

A virtual machine generally refers to an operating system running over a hypervisor. For at least some embodiments, actual services are running as applications over the virtual machine. A user interacts with the application. The user does not interact directly with the operating system. The operating system is typically transparent to the user. The application software developers typically hardly modify the operating systems to run their applications. Even if the operating system is modified, the application is not bundled as part of the operating system. For at least some embodiments, the application stays as an individual installable package. During remote provisioning of applications, moving the operating system from a provisioning source to a destination is unnecessary overhead.

The AVM unit is a core component which includes multiple modules. The AVM unit is an application software component, a system software component, a firmware component, a hardware component, or a combination thereof.

FIG. 1B shows another exemplary embodiment of a portion of a data processing system to provide an application provisioning over hypervisors.

A data processing system 110 includes a hypervisor 112 directly on a hardware 111. For an embodiment, hardware 111 comprises a processor (not shown) coupled to a memory (not shown). For one embodiment, hypervisor 112 is a bare metal hypervisor. Hypervisor 112 runs a guest virtual machine 113. An AVM unit operates on guest virtual machine 113. The AVM unit 114 runs as an application on a guest virtual machine 113 over a bare metal hypervisor 112. For an embodiment, hypervisor 112 is a target hypervisor.

FIG. 1C shows another exemplary embodiment of a portion of a data processing system to provide an application provisioning over hypervisors as described herein. As shown in FIG. 1C, a data processing system 120 comprises a host operating system 122 over a hardware 121. For an embodiment, hardware 121 comprises a processor (not shown) coupled to a memory (not shown). A hypervisor 123 runs a virtual machine 125 over host operating system 122. An AVM unit 124 is alongside of hypervisor 123 over host operating system 122. For one embodiment, the AVM unit 124 is an application software component. For an embodiment, hypervisor 123 is a target hypervisor.

Figure 1D:
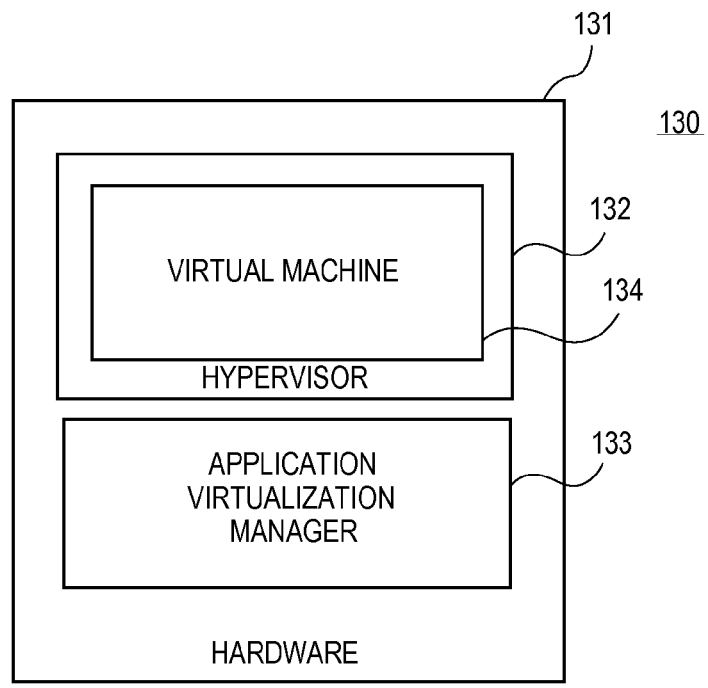
FIG. 1D shows another exemplary embodiment of a portion of a data processing system to provide an application provisioning over hypervisors.

FIG. 1D shows another exemplary embodiment of a portion of a data processing system to provide an application provisioning over hypervisors. Data processing system 130 comprises a virtual machine 134 over a hypervisor 132 on hardware 131. For an embodiment, hardware 131 comprises a processor (not shown) coupled to a memory (not shown). AVM unit 133 is implemented directly on hardware 131. For one embodiment, the AVM unit 133 is a part of a pluggable interface card, a peripheral controller interconnect ("PCI"), a PCI-E, a System on a Chip, or a part of the processor. AVM unit 133 can comprise a microcode on a core of a single/multi core processor or an application specific integrated circuit ("ASIC"). For an embodiment, hypervisor 132 is a target hypervisor.

FIG. 1E shows another exemplary embodiment of a portion of a data processing system to provide an application provisioning over hypervisors as described herein. As shown in FIG. 1E, a data processing system 140 comprises a guest virtual machine 144 and an AVM unit 145 on a hypervisor 143 on a host operating system 142 on a hardware 141. For an embodiment, hardware 141 comprises a processor (not shown) coupled to a memory (not shown). For one embodiment, the hypervisor 142 is a host operating system based hypervisor. For one embodiment, the AVM unit 145 is a part of the host operating system based hypervisor. For an embodiment, hypervisor 143 is a target hypervisor as described herein.

FIG. 1F shows another exemplary embodiment of a portion of a data processing system to provide an application provisioning over hypervisors as described herein. As shown in FIG. 1F, a data processing system 150 comprises a guest virtual machine 153 and an AVM unit 154 on a hypervisor 152. Hypervisor 152 runs directly on hardware 151. For an embodiment, hardware 151 comprises a processor (not shown) coupled to a memory (not shown). For one embodiment, the hypervisor is a bare metal based hypervisor. For one embodiment, the AVM unit 154 is a part of the bare metal based hypervisor. For an embodiment, hypervisor 152 is a target hypervisor as described herein.

Figure 2:
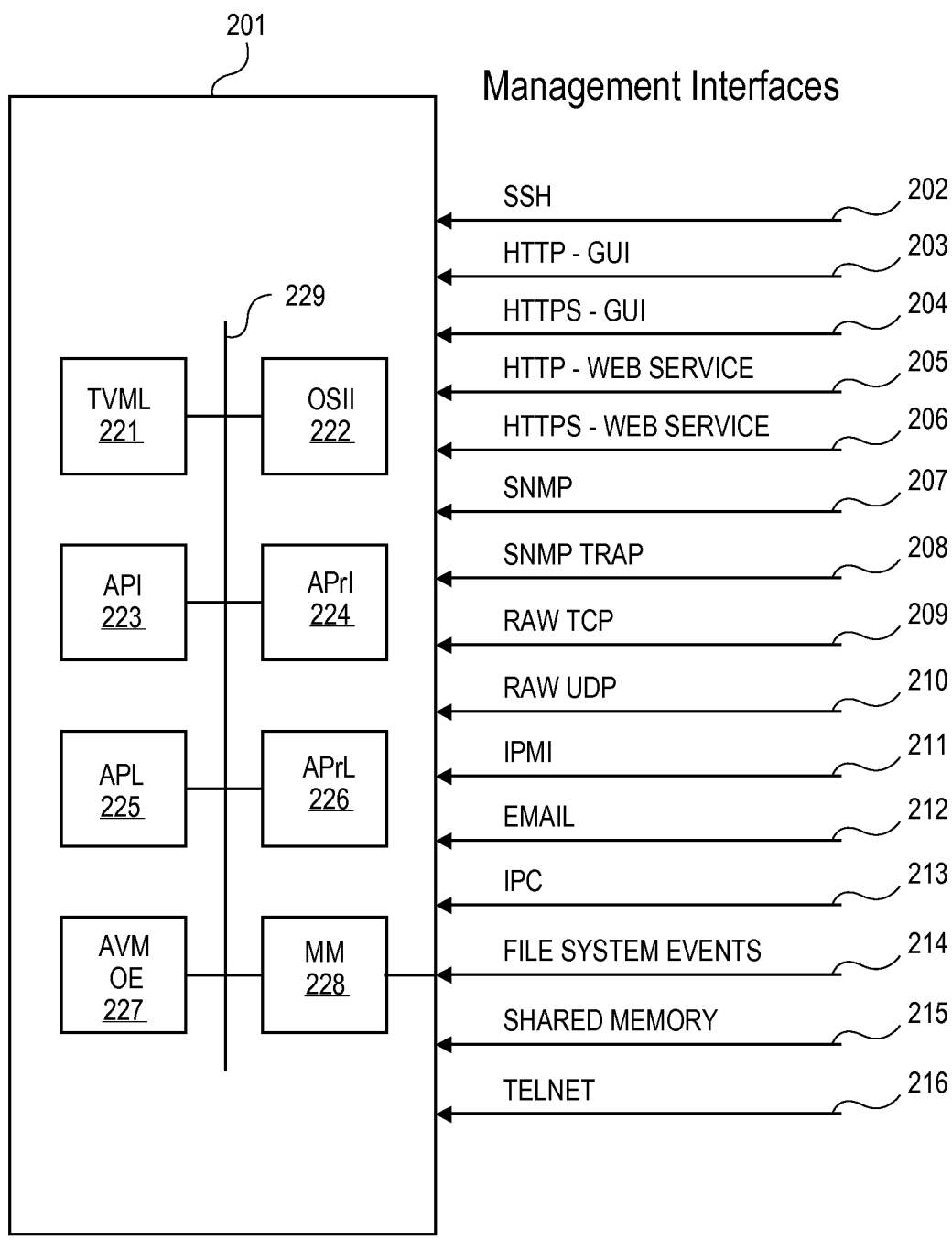
FIG. 2 shows a block diagram illustrating an exemplary embodiment of an application virtualization management ("AVM) unit.

FIG. 2 shows a block diagram 200 illustrating an exemplary embodiment of an application virtualization management ("AVM") unit. An AVM unit 201 represents one of AVM unit 105, AVM unit 114, AVM unit 124, AVM unit 133, AVM unit 145, and AVM unit 154 depicted in FIGS. 1A-1F. As shown in FIG. 2, an AVM unit 201 comprises a template virtual machine library ("TVML") module 221, an operating system image importer ("OSII") module 222, an application package importer ("API") module 223, an application prerequisites importer ("APrI") module 224, an application package library ("APL") module 225, an application prerequisites library ("APrL") module 226, an AVM orchestration engine ("AVM OE") module 227, and a management module ("MM") 228. For an embodiment, the modules 221-228 are located together on a single system on a chip. For an embodiment, modules 221-228 are located on separate chips. For an embodiment, the separate modules of AVM 201 communicate with each other through at least one of the hardware and software based communication interfaces using a communication link 229 (e.g., a bus, or other communication link).

For at least some embodiments, the AVM unit 201 comprises the modules for virtual machine creation, application migration, application launching, orchestration management and management interfaces. For one embodiment, each of the template virtual machine library, application package library and application prerequisites library has at least one associated importer module which supports various file transfer protocols to import various images and packages.

As shown in FIG. 2, the AVM module 201 has a plurality of management interfaces to connect to a user according to various communication protocols and to receive the application migration requests from the user. As shown in FIG. 2, the AVM module has a Secure Shell ("SSH") interface 202, a Hypertext Transfer Protocol ("HTTP")-Graphical User Interface ("GUI") 203, a Hypertext Transfer Protocol Secure ("HTTPS")-GUI interface 204, an HTTP-Web service 205 interface, an HTTPS-Web service interface 206, a Simple Network Management Protocol ("SNMP") interface 207, an SNMP TRAP interface 208, a RAW Transmission Control Protocol ("TCP") interface 209, a RAW Universal Datagram Protocol ("UDP") interface 210, an Intelligent Platform Management Interface ("IPMI") interface 211, an email interface 212, an Interprocess Communication ("IPC") interface 213, a file system events interface 214, a shared memory interface 215, and a TELNET interface 216.

As part of the Remote Application Provisioning, a user sends a request to move the application. The request includes an Application Loader script for installation, configuration, and launching, along with other parameters that are required to run the AVM orchestration. An AVM Orchestration Engine of the AVM unit 201 uses the provided parameters to bring up the virtual machine and uses the Application Loader script to launch the application.

The virtual machine or Physical Machine from which the application needs to be migrated, connects with the AVM running on the target hypervisor through one of the management protocols such as a Command Line Interface ("CLI") (Telnet, SSH), HTTP/HTTPs, Web Services, SNMP and others a corresponding management interfaces e.g., one of the interfaces 202-216. The interfaces 202-216 are part of a management module 228.

Figure 3:
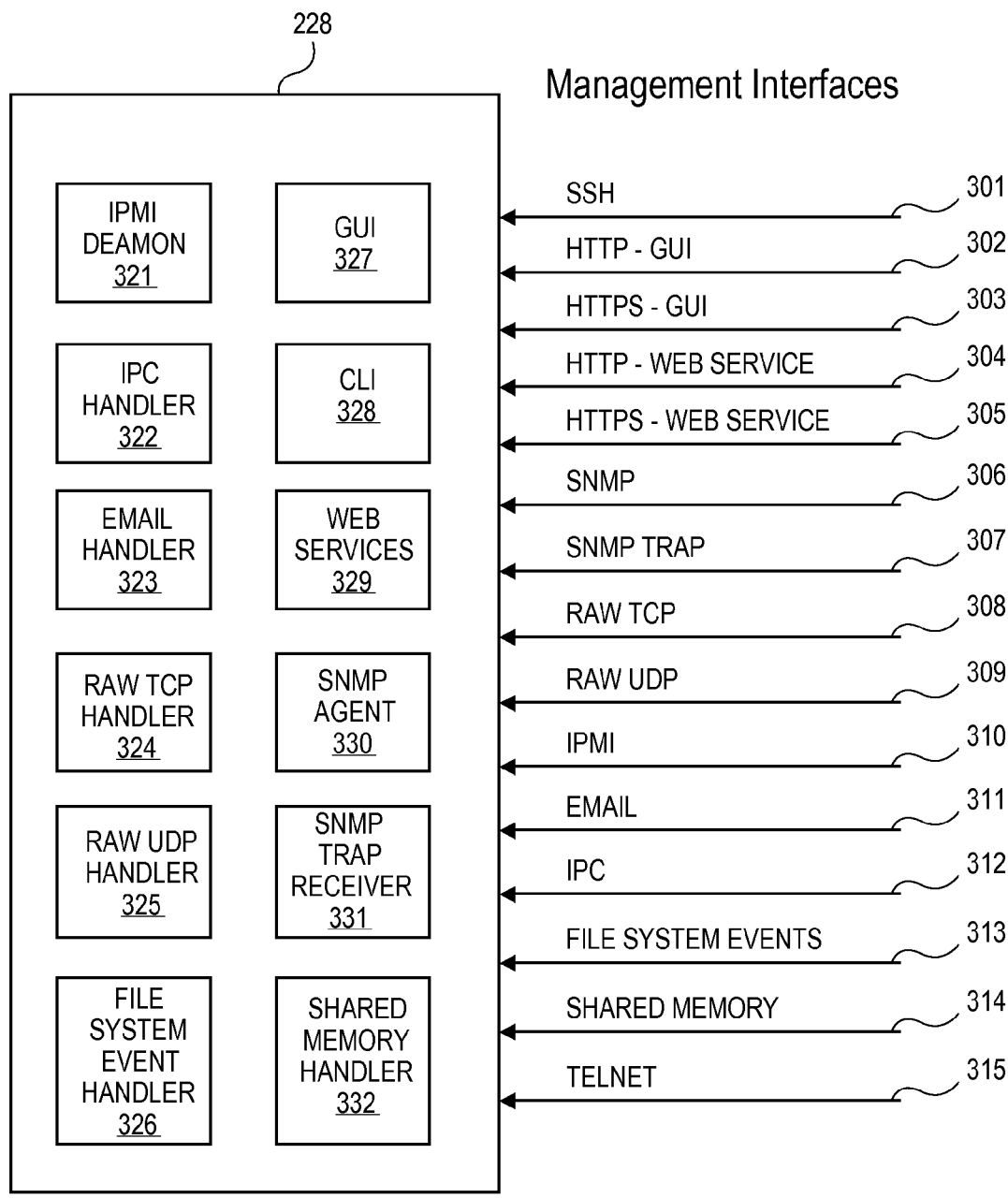
FIG. 3 shows a block diagram of an exemplary embodiment of a management module of the AVM unit.

FIG. 3 shows a block diagram 300 of management module 228, which comprises a plurality of management sub-modules including an IPMI DAEMON 321, an IPC handler 322, an email handler 323, a raw TCP handler 324, a raw UDP handler 325, a file system event handler 326, a GUI handler 327, a CLI handler 328, a web services handler 329, an SNMP agent 330, an SNMP TRAP receiver 331, and a shared memory handler 332. A SSH interface 301, an HTTP-GUI 302, an HTTPS-GUI 303, an HTTP-Web service interface 304, an HTTPS-Web service interface 305, an SNMP interface 306, an SNMP TRAP interface 307, a RAW TCP interface 308, a RAW UDP interface 309, an IPMI interface 310, an email interface 311, an IPC interface 312, a file system events interface 313, a shared memory interface 314, and a TELNET interface 315 are connected to management module 200.

For one embodiment, the GUI module 327 handles the requests from the HTTP protocol interface 302 or HTTPS protocol interface 303. IPMI DAEMON 321 handles the requests coming through IPMI interface 31. IPC handler 322 handles the request coming through IPC messages interface 312. Email Handler 323 handles the requests that are coming in the form of emails via email interface 311. Raw TCP handler 324 handles the requests coming through the raw TCP session interface 308. Raw UDP handler 325 handles the requests coming through the raw UDP session interface 309.

For one embodiment, the requests coming through the local and network File System events interface 313 are handled by File System Even Handler module 326. CLI module 328 handles the requests from SSH interface 301, and telnet interface 315. Web Services module 329 handles the web services requests coming through HTTP interface 304 and HTTPS interface 305. SNMP Agent 330 provides the interface from monitoring through SNMP interface 306, and SNMP Trap Receiver 331 listens and receives SNMP Traps 307. Shared Memory Handler 332 is a module that handles the request coming through Shared Memory interface 314.

The virtual machine or Physical Machine from which the application needs to be migrated provides the AVM unit with one or more parameters, e.g., the application type, application image parameters, OS image parameters, provisioning schedule, networking parameters, security policies, infrastructure parameters and post-launch validation parameters via for example, one or more of the interfaces as depicted in FIGS. 2 and 3. The AVM unit uses the OS image parameters to identify the template virtual machine ("TVM") and boots the TVM based on the provisioning schedule specified.

For one embodiment, after the TVM is booted, the AVM unit identifies and invokes the Network Security Validation and Configuration Script ("NSVCS"). After the NSVCS is successfully completed the AVM identifies and invokes the Application Prerequisites Loader ("APL") and then Application Loader ("AL"). After the successful launch of the application, a Post Processing Engine ("PPE") of the AVM unit validates the application and notifies the administrator about the status and results.

For at least one embodiment, migrating of the application without the operating system as described herein takes only 1 minute. For example, if the carrier charges one cent per Megabyte ("MB"), the total cost of the transfer for the application without the operating system VM image transfer will be only $1, which is significantly lower than the total cost of the transfer of the application with the operating system VM image transfer.

Figure 4A:
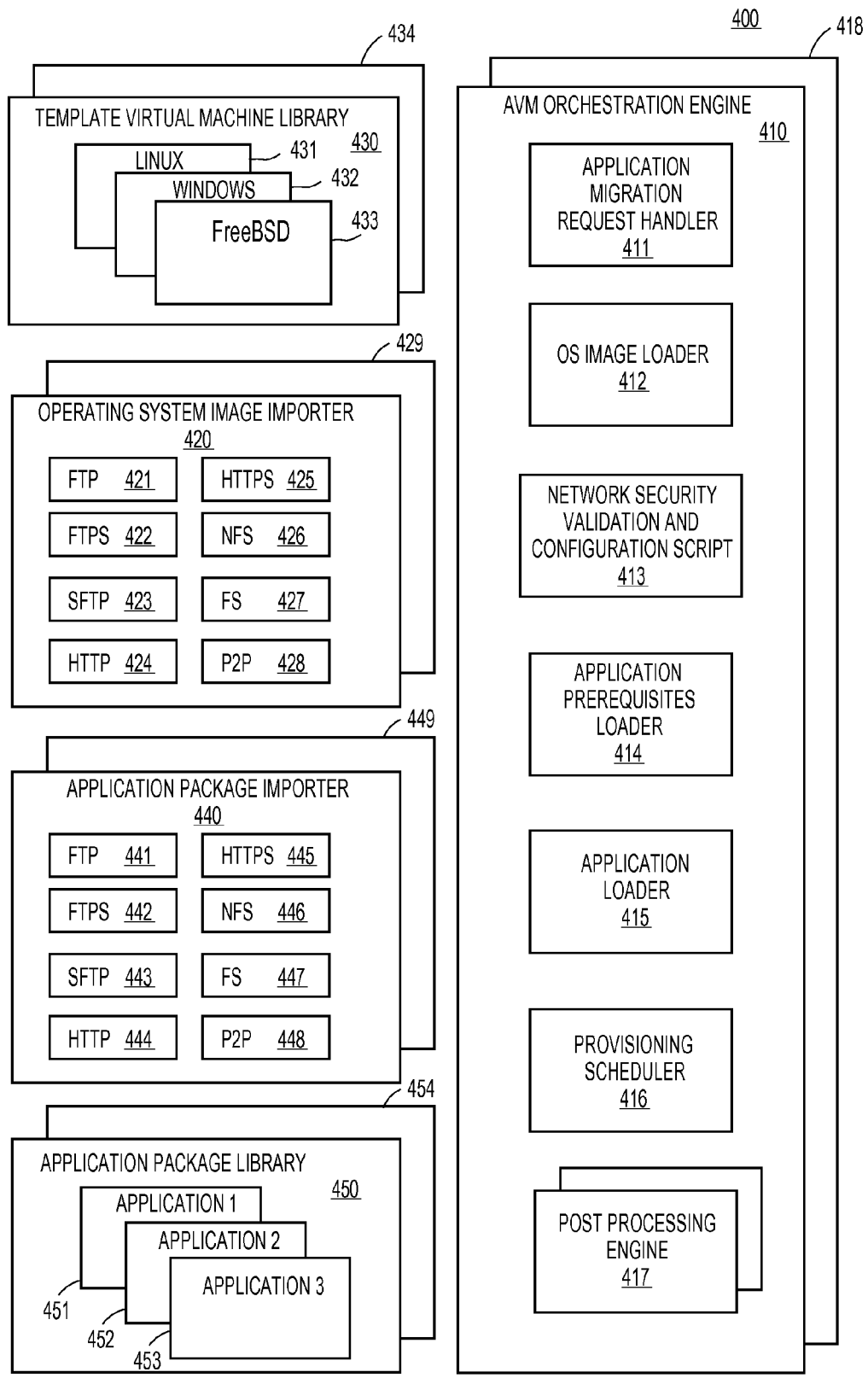
FIG. 4A shows a first portion of a block diagram illustrating an exemplary embodiment of an AVM unit.
Figure 4B:
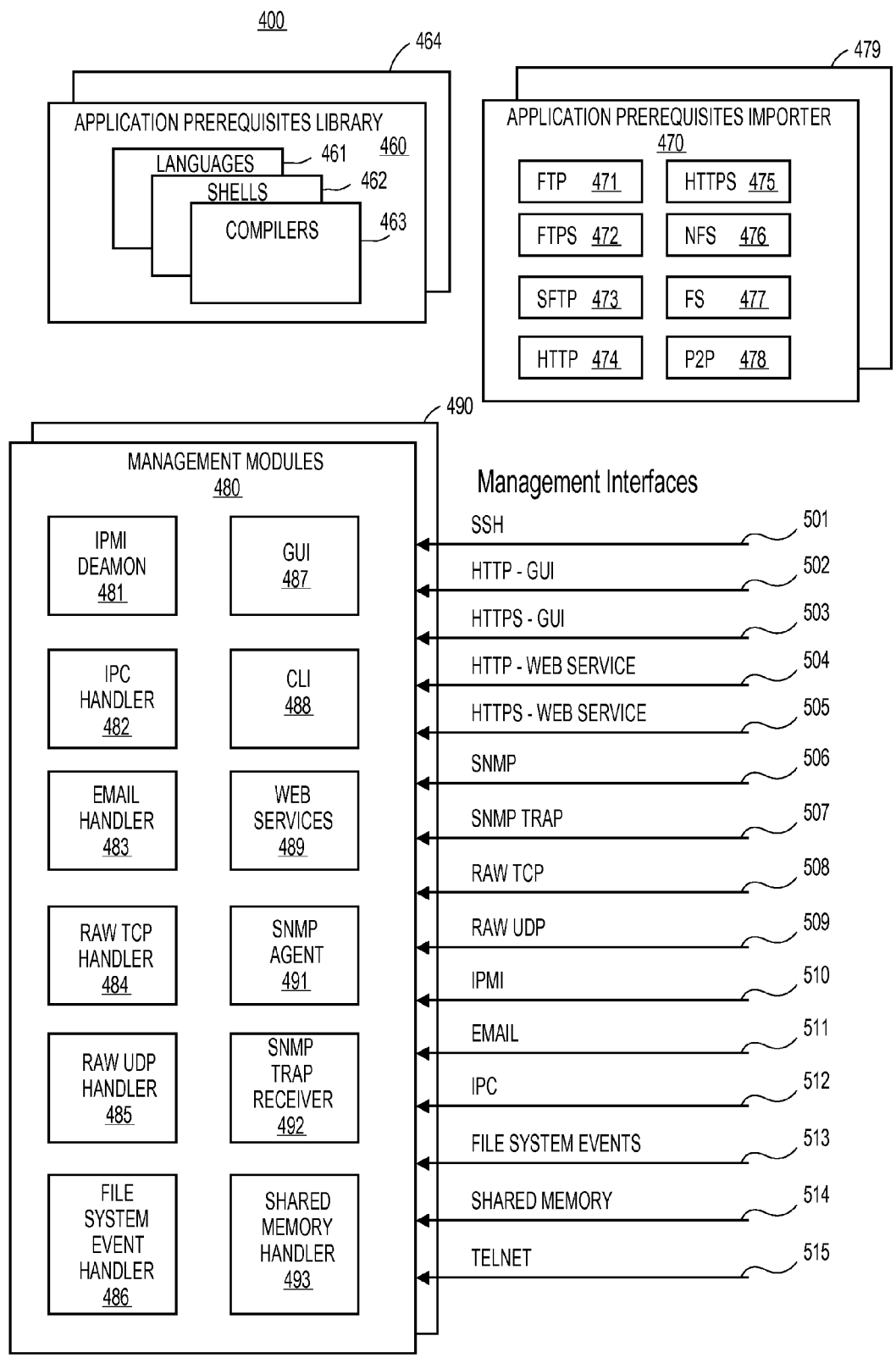
FIG. 4B shows a second portion of a block diagram illustrating an exemplary embodiment of an AVM unit.

FIG. 4A shows a first portion of a block diagram illustrating an exemplary embodiment of an AVM unit 400. FIG. 4B shows a second portion of a block diagram illustrating an exemplary embodiment of AVM unit 400. AVM unit 400 represents one of the AVM units depicted in FIGS. 1A-1F, and 2. AVM unit 400 comprises an AVM orchestration engine ("AVM OE") 410, an operating system image importer 420 ("OSII"), a template virtual machine library ("TVML") 430, an application package importer ("API") 440, an application package library ("APL") 450, an application prerequisites library ("APrL") 460, an application prerequisites importer ("APrI") 470, a management module ("MM") 480 and a plurality of interfaces 501-515, as described herein.

For one embodiment, AVM OE 410 comprises a multi-threaded application migration request handler 411, an OS image handler 412, a network security validation and configuration script 413, an application prerequisites loader 414, an application loader 415, a provisioning scheduler 416, and a post processing engine 417. OSII 420 comprises a File Transfer Protocol ("FTP") OSII 421, a File Transfer Protocol Secure ("FTPS") OSII 422, a Secure File Transfer Program ("SFTP") OSII 423, an HTTP OSII 424, an HTTPS OSII 425, a Network File System ("NFS") OSII 426, a File Sharing ("FS") OSII 427, a Peer-to-Peer ("P2P") OSII 428, and other communication protocol OSII (not shown). TVML 430 comprises a LINUX template VM library 431, a WINDOWS template VM library 432, and a FreeBSD template VM library 433. For other embodiments, other operating system template VM library are included in TVML 430.

For one embodiment, API 440 comprises an FTP API 441, an FTPS API 442, an SFTP API 4423, an HTTP API 444, an HTTPS API 445, an NFS API 446, an FS API 447, and a P2P API 448. For other embodiments, other communication protocol APIs are included in API 440. APL 450 comprises a plurality of application libraries, e.g., an application library 451, an application library 452, and an application library 453.

For one embodiment, an APrL 460 comprises a plurality of libraries, e.g., a languages library 416, a shells library 462, and a compiler library 463. For one embodiment, APrI 470 comprises an FTP APrI 471, an FTPS APrI 472, an SFTP APrI 473, an HTTP APrI 474, an HTTPS APrI 475, an NFS APrI 476, an FS APrI 477, and a P2P APrI 478. For other embodiments, other communication protocol APrIs are included in APrI 470. For one embodiment, management module 480 comprises a plurality of management sub-modules, such as an IPMI DAEMON 481, an IPC handler 482, an email handler 483, a raw TCP handler 484, a raw UDP handler 485, a file system event handler 486, a GUI handler 487, a CLI handler 488, a web services handler 328, an SNMP agent 329, an SNMP TRAP receiver 330, and a shared memory handler 331, and corresponding interfaces such as interfaces 501-515, as described above. Management Module 480 manages the configuration, monitoring and notification of the AVM unit.

For one embodiment, AVM OE 410 receives a request through one of the management interfaces of the management module 480. A request includes one or more operating system image parameters, one or more application parameters, and other parameters, as described above. AVM OE 410 passes the request to the application migration request handler 411. Application migration request handler 411 passes the operating system image parameters to the operating system image loader 412 to load the image from the template virtual machine library 430. Operating system image loader 412 looks up in the template virtual machine library 430 to see if the image is available. If the image is available, the image is loaded over the hypervisor. If the image is not available in TVML, then the OSII 420 tries to download the image using one of the protocols from a source server from which the application migration request is sent or from another location specified as part of the OS image parameters.

For one embodiment, AVM OE 410 invokes the content availability checking process concurrently on application prerequisites loader module 414 and on application loader module 415. Each of these modules 414 and 415 checks if the required packages are available in their respective libraries. Application prerequisites loader module 414 checks if the required application prerequisites packages are available in the Application Prerequisites Library 460. Application loader module 415 checks if the required application packages are available in the application package library 450. If the corresponding packages are not available in their respective local libraries, e.g., libraries 450 and 460, then AVM OE 410 invokes concurrent file transfer tasks through application package importer 440 and application prerequisites importer 470 to download the respective packages from the request source system or from the location specified by the application parameters included in the request to the respective libraries.

After the applications prerequisites are moved to the application prerequisites library 460, the application prerequisites loader 414 invokes the installation and configuration process of the prerequisites. After the installation and configuration process of the prerequisites is completed, application loader 415 loads the application binaries from the application package library 450 and invokes the installation and configuration process of the application.

For one embodiment, the provisioning scheduler 416 maintains the schedule for operating system virtual machine launch, application installation, and application launching. Based on the launching schedule on the provisioning scheduler 416, the application loader 415 launches the application.

After the launch of the application is completed, the post processing engine 417 is invoked. The post processing engine performs the validation tests on the launched application and provides the results through the management modules 480. The application virtualization migration orchestration engine operates advantageously to bring up the application promptly by putting operating systems, application prerequisites, and application packages together over a target hypervisor. For an embodiment, the multithreaded application migration request handler invokes the discovery and loading of the operating system, application prerequisites, and an application on concurrent threads to conserve time to bring up the VM with the application running. The AVM unit having the application prerequisites library and application library and their corresponding importer modules provides faster application migration than traditional techniques.

Remote application provisioning as described herein reduces the size of the payload moved to a target hypervisor providing savings in time. Remote application provisioning as described herein reduces the hardware resource utilization at a hypervisor, at a host operating system and at a guest operating system levels by limiting the moved image only to an application level that has a small footprint. For an embodiment, remote application provisioning as described herein reduces network bandwidth consumption in multiple times comparing to that of the traditional techniques by avoiding the operating system image migration and using instead the operating image from the target hypervisors prebuilt libraries.

For an embodiment, remote application provisioning as described herein makes the stateful application migration possible. A stateful application can refer to a firewall application that that keeps track of the state of network connections (such as TCP streams, UDP communication) traveling across the firewall. Because the remote application provisioning is much faster than the traditional techniques, the sessions from the source VM can be quickly redirected to the target VMs, so that the applications do not need to timeout their active sessions during the application transfer process.

For an embodiment, the AVM unit can be implemented as software, firmware, hardware, or a combination thereof. For an embodiment, the modules of the AVM unit as described herein are located together on a single system on a chip. For an embodiment, the modules of the AVM unit are located on separate chips. For an embodiment, the separate modules of the AVM unit communicate with each other through at least one of the hardware and software based communication interfaces, e.g., a communication link (e.g., a bus, or other communication link). For an embodiment, the separate modules of the AVM unit allow the scaling of the AVM to support large scale systems.

For an embodiment, the AVM unit is implemented with multiple instances of the functional modules on a single implementation to provide fault tolerance. As shown in FIG. 4A, the TVML module has multiple instances e.g., TVML 430 and a TVML 434, the OSII module has multiple instances e.g., OSII 420 and an OSII 429, the API has multiple instances e.g., API 440 and a API 449, the AVM OE module has multiple instances e.g., AVM OE 410 and an AVM OE 418, the APrL module has multiple instances e.g., APrL 460 and an APrL 464, the APrI module has multiple instances e.g., APrI 470 and APrI 479, the management module has multiple instances, e.g., MM 480 and an MM 490.

Figure 5:
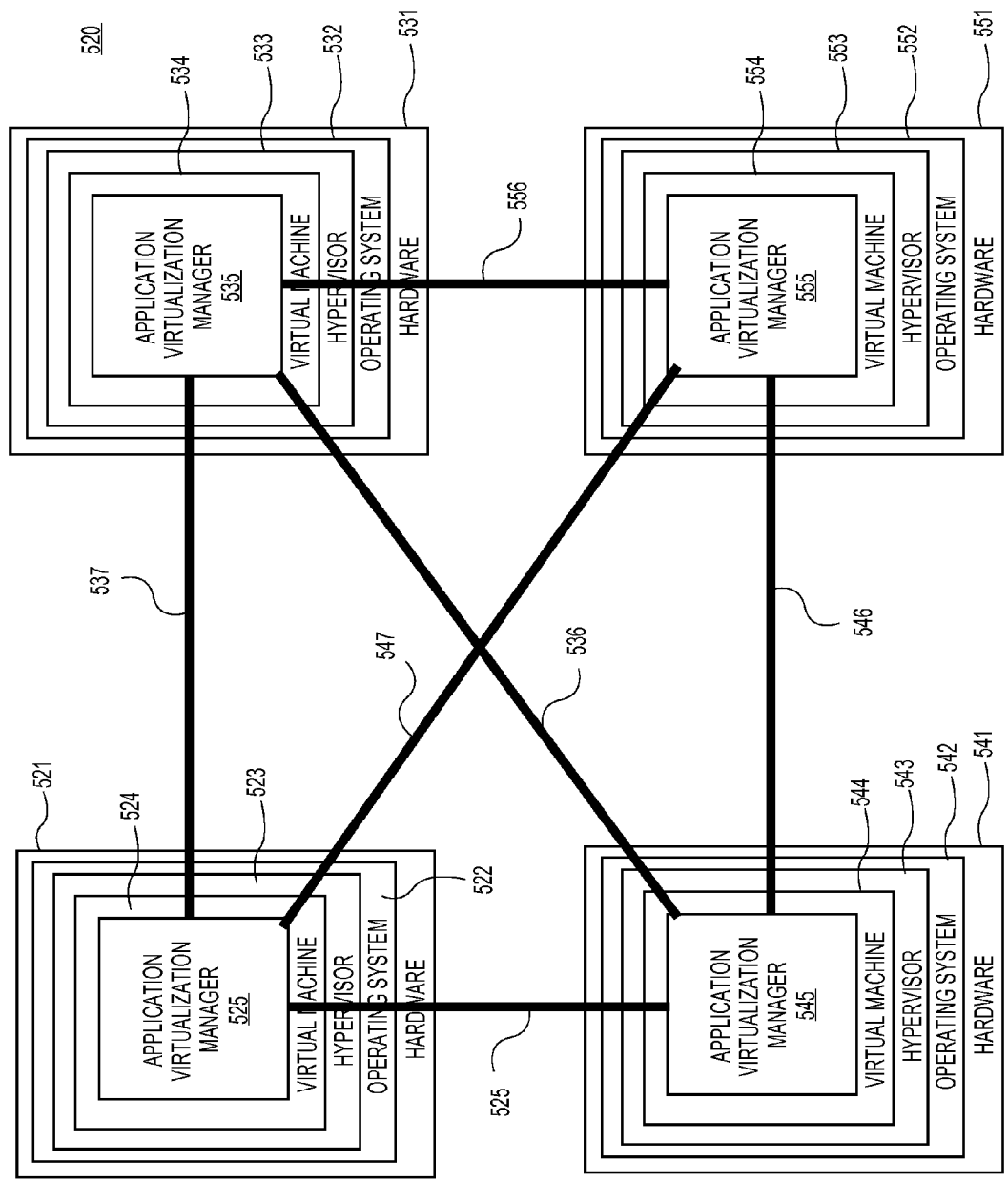
FIG. 5 shows a block diagram of an exemplary embodiment of a data processing system to provide remote application provisioning implemented in a distributed manner.

FIG. 5 shows a block diagram of an exemplary embodiment of a data processing system 500 to provide remote application provisioning implemented in a distributed manner. The AVM unit as described herein comprises an AVM sub-unit 525, an AVM sub-unit 535, an AVM sub-unit 545, an AVM sub-unit 555. An AVM sub-unit 525 operates over a virtual machine 524 on a hypervisor 523 over an operating system 522 over a hardware 521. An AVM sub-unit 535 operates over a virtual machine 534 on a hypervisor 533 over an operating system 532 over a hardware 531. An AVM sub-unit 545 operates over a virtual machine 544 on a hypervisor 543 over an operating system 542 over a hardware 541. An AVM sub-unit 555 operates over a virtual machine 554 on a hypervisor 553 over an operating system 552 over a hardware 551. The AVM sub-units 525, 535, 545, and 555 communicate with each other via communication links, such as links 525, 536, 537, 546, 547, and 556, to perform methods as described herein. For an embodiment, each of hardware 521, hardware 531, hardware 541, and hardware 551 comprises a processor coupled to a memory. For an embodiment, at least one of the hypervisors 523, 533, 543, and 553 is a target hypervisor.

Figure 6:
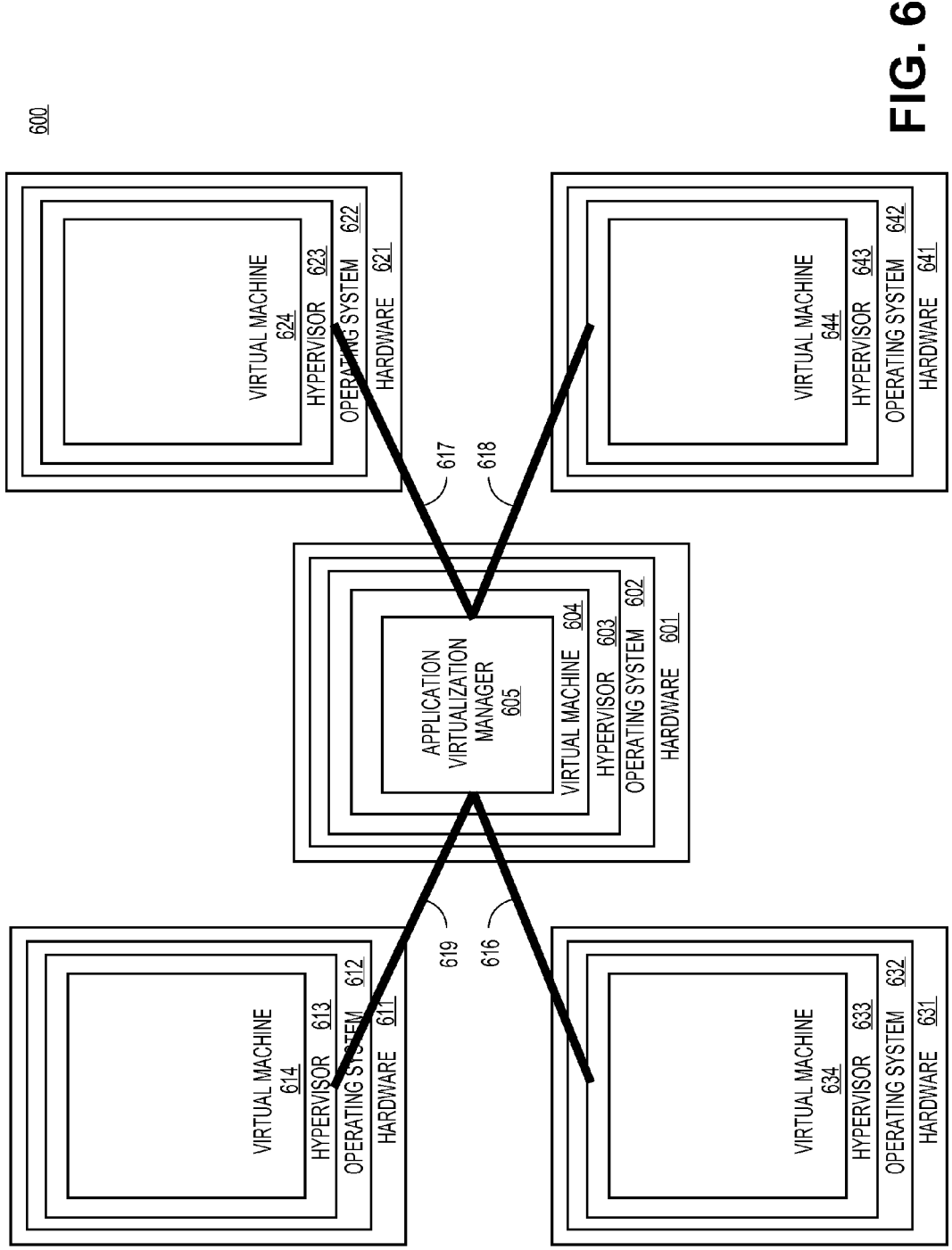
FIG. 6 shows a block diagram of another exemplary embodiment of a data processing system 600 to provide remote application implemented in a centralized manner.

FIG. 6 shows a block diagram of another exemplary embodiment of a data processing system 600 to provide remote application implemented in a centralized manner. An AVM unit 605 operates over a virtual machine 604 on a hypervisor 603 over an operating system 602 over a hardware 601. A virtual machine 614 runs on a hypervisor 613 over an operating system 612 on a hardware 611. A virtual machine 624 runs on a hypervisor 623 over an operating system 622 on a hardware 621. A virtual machine 634 runs on a hypervisor 633 over an operating system 632 on a hardware 631. A virtual machine 644 runs on a hypervisor 643 over an operating system 642 on a hardware 641. The AVM unit 605 communicates with each of the VMs 614, 624, 634, and 644 via communication links, such as links 616, 617, 618, and 619 to perform methods as described herein. For an embodiment, each of hardware 601, the hardware 611, hardware 621, hardware 631, and hardware 641 comprises a processor coupled to a memory. For an embodiment, at least one of the hypervisors 603, 613, 623, 633, and 643 is a target hypervisor.

Figure 7A:
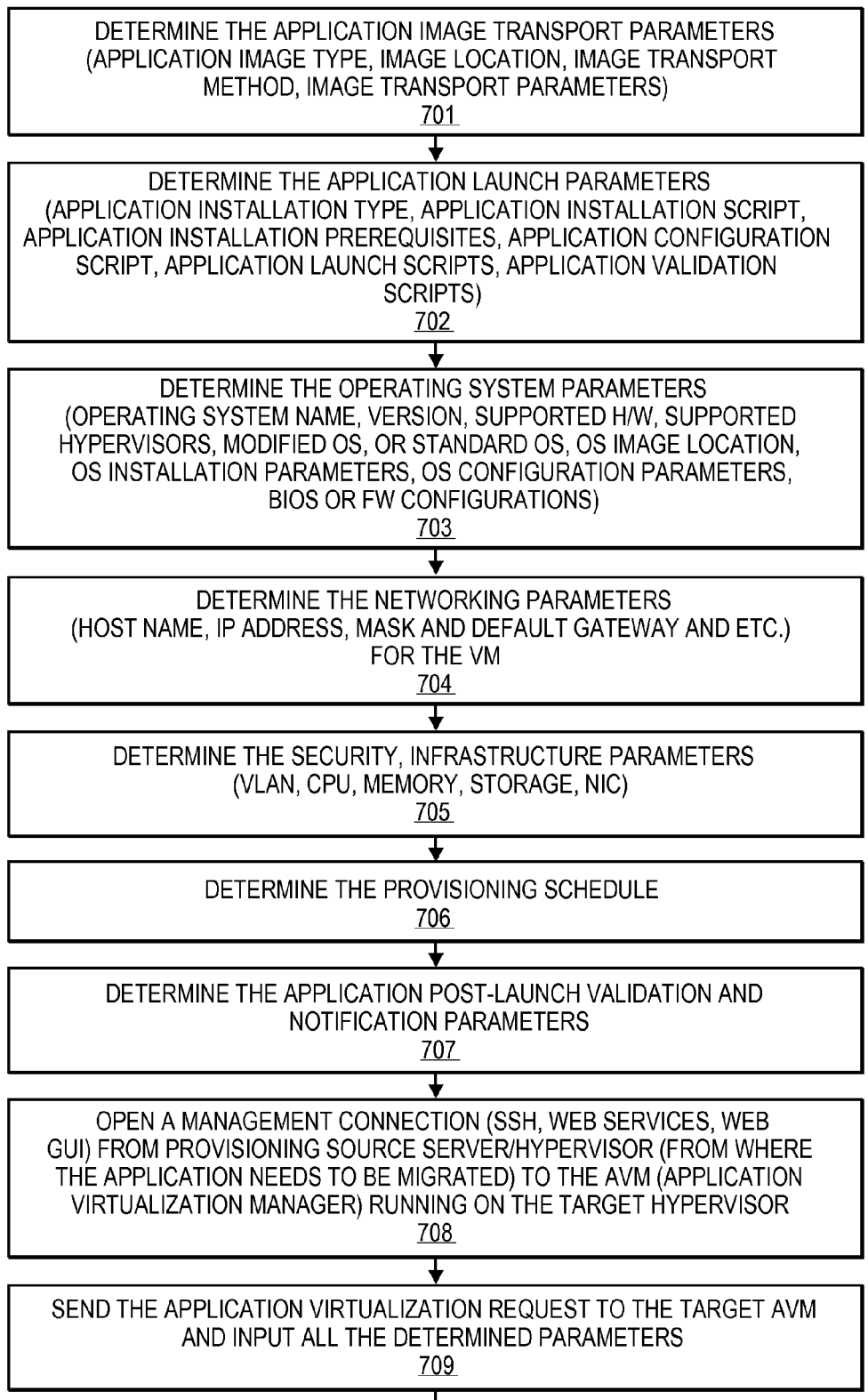
FIG. 7A shows a first portion of an exemplary embodiment of a method to provide remote application provisioning.

FIG. 7A shows a first portion of an exemplary embodiment of a method 700 to provide remote application provisioning. At block 701 the application image transport parameters are determined. For an embodiment, the application image parameters include, e.g., at least one of an application image type, an image location, an image transport method, and other application image parameters.

For an embodiment, application image type specifies how the application binaries are packaged. Image location specifies the URL (e.g., in case of the HTTP protocol) or other types of addresses. The image transport method specifies the mode of transfer of the application package/image. It could be HTTP, FTP, shared file system or any other transport method. Image transport parameters specify the details (addresses, credentials) of the transfer process.

At block 702, application launch parameters are determined. For an embodiment, the application launch parameters include at least one of an application installation type, an application installation script, application installation prerequisites, an application configuration script, an application launch script, an application validation script, and other application launch parameters.

In other words, at block 702, the parameters specifying the application installation, configuration, and launch are determined. These parameters indicate whether the installation is a package installation, a type of the installation script, a command, etc), installation prerequisites (e.g., programming language support, compilers, libraries, shells and other requirements to run the installation scripts), application configuration script (a type of the script, a script location within an application migration package) and other scripts for application configuration, launch and validation.

At block 703, operating system parameters are determined. For an embodiment, the operating system parameters include at least one of an operating system name, an operating system version, supported hardware, supported hypervisors, data about whether the OS is modified, or a standard OS, an OS image location, OS installation parameters, OS configuration parameters, BIOS or FW configurations, and other operating system parameters.

For an embodiment, the target VM operating system does not need to be the same as the application migration source VM or Physical machine. The operating system parameters indicate, for example, a name and a version of the operating system. If the OS is customized for this application then the OS parameters include the data about the OS customizing. If the OS is not modified, the application virtualization manager unit can get the operating system from generic repositories. The OS parameters include the OS image location and other transfer parameters to determine the location from which the AVM unit needs to pull the OS image file. The parameters indicating hardware components and capabilities needed for the application determine if the migration request to the specified target server should proceed or to be dropped.

At block 704, the target machine networking parameters are determined. For one embodiment, the networking parameters include at least one of a host name, an IP address, a gateway configuration, a mask, a default gateway, and other networking parameters for a VM. The target machine networking parameters need to be determined before placing an application migration request by a user device.

At block 705 infrastructure, security and hypervisor parameters are determined. For an embodiment the infrastructure, security and hypervisor parameters include at least one of a CPU, a memory, a storage allocation, an interface Virtual Local Area Network ("VLAN") configuration, NIC, and other security and infrastructure parameters.

At block 706, the provisioning schedule data are determined. For at least some embodiments, provisioning schedule determined for an OS image loading and VM boot up; for application prerequisites installation and configuration; and for application installation and start up (e.g., application configuration and application launching).

At block 707, the application post-launch validation and notification parameters are determined. At block 708, a management connection (e.g., SSH, Web services, Web GUI) is opened, e.g., from a user device, or other provisioning source from which the application needs to be migrated to an AVM unit running on a target hypervisor to send the application migration request. For an embodiment, the opened management connection is a CLI (SSH, Telnet, Row Socket, etc.) connection. For an embodiment, the opened management connection is a GUI (Web GUI, Client side thick applications, third party GUI tools, etc.) connection. For an embodiment, the opened management connection is an application program interface (Web services, Remote Procedure Call ("RPC"), etc.) connection. For an embodiment, the opened management connection is a messaging connection (email, Wireless Sensor Network "WSN"), Java Message Service ("JMS"), SNMP request, and etc.). For an embodiment, the management interface connection is opened through one of the management protocol interfaces as specified in FIGS. 2, 3, and 4B. The provisioning source is a server. The provisioning source has a hypervisor from which the application needs to be migrated.

At block 709, an application virtualization request is created and sent to a target AVM unit by a user device. For an embodiment, the request includes the parameters determined in blocks 701-707. For an embodiment, the parameters of blocks 701-707 are determined before sending the application image migration request by a user device. For an embodiment, all the determined parameters are sent to the application virtualization manager unit as part of the application image migration request. The request is sent to the Application Virtualization Manager unit as command line parameters, GUI fields, Web Services input parameters, or other input parameters depending on the user's choice of the management interfaces. A request to move an application from a source including the parameters, as determined at blocks 701-707 is received by the AVM unit via one or more of the management module interfaces, e.g., the management interfaces as depicted in FIGS. 2, 3, and 4B. Next, method 700 proceeds to block 711.

Figure 7B:
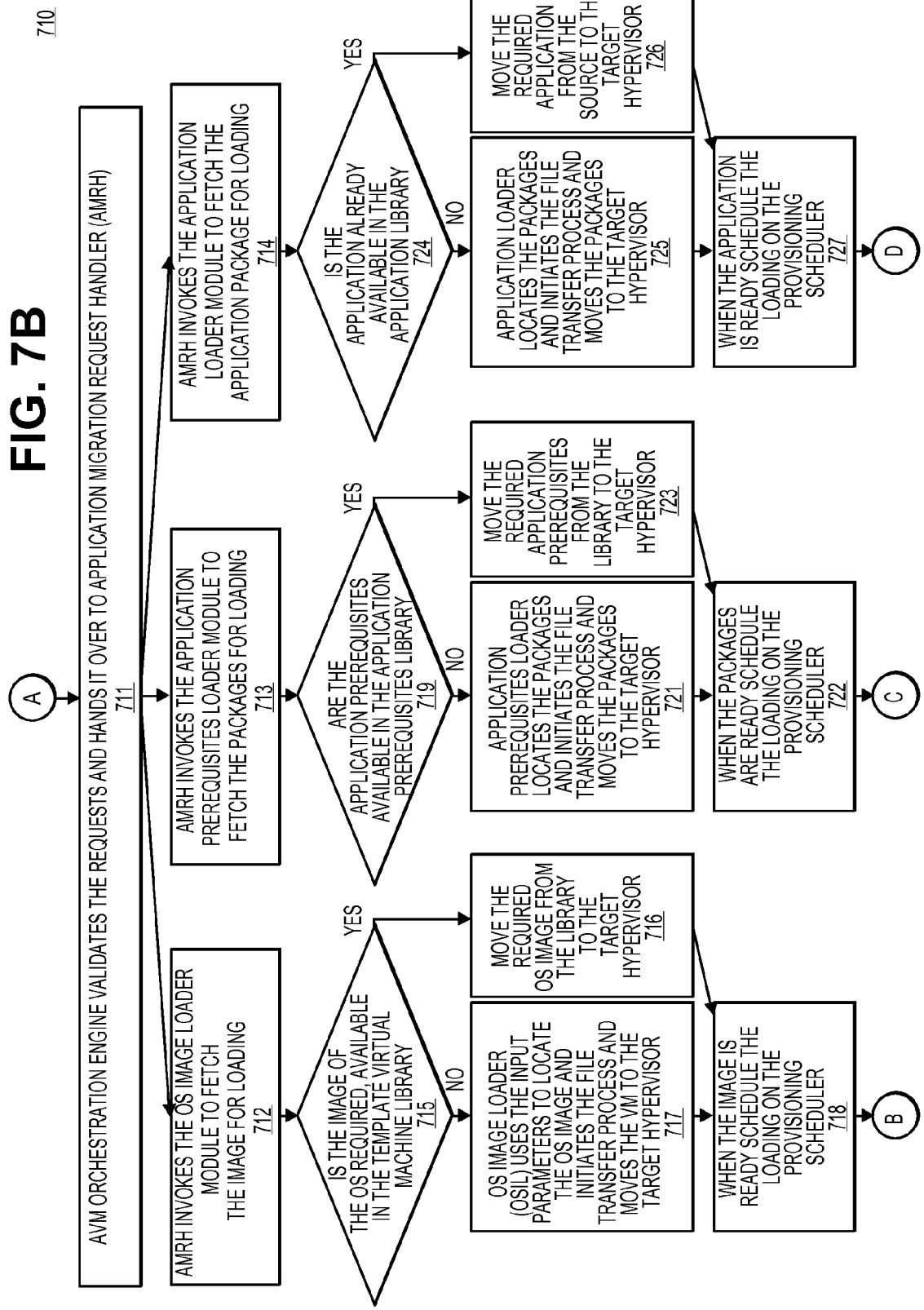
FIG. 7B shows a second portion of the exemplary embodiment of the method to provide remote application provisioning.

FIG. 7B shows a second portion 710 of the exemplary embodiment of the method 700 to provide remote application provisioning. At block 711, the AVM orchestration engine, such as AVM OE 410, receives the request through the MM module, such as MM 480, validates the request, and passes the request to the application migration request handler sub-component, e.g., AMRH 411. At block 712, the AMRH invokes the OS image loader module, e.g., OS image loader 412 to fetch the image for loading. At block 713, the AMRH invokes the application prerequisites loader module, e.g., application prerequisites loader module 414 to fetch the application prerequisites packages for loading. At block 714, the AMRH invokes the application loader module, e.g., application loader module 415 to fetch the application packages for loading. For one embodiment, fetching the operating system image at block 712, fetching application prerequisites packages at block 713, and fetching application packages at block 714 are performed concurrently.

For one embodiment, the AVM Orchestration Manager (AOE) receives the request through the management module and passes the request to the Application Migration Request Handler (AMRH) sub component of the AOE for parsing and validating. The AMRH validates the request for completeness and invokes three concurrent processes/threads starting at blocks 712, 713, and 714, respectively, to fetch the operating system image, application dependency packages, and application packages.

On the first (starting at block 712) thread/process, it is determined at block 715 whether or not the image of the required OS is available in the template virtual machine library, e.g., TVML 430. For an embodiment, the OS image loader ("OSIL") module, e.g., OSIL module 412, checks if the required operating system with the name and version as specified in the request is available in the template virtual machine library. If the image is not available in the TVML, at block 717 the OSIL uses the input parameters to locate the OS image, initiates the file transfer process, and moves the OS image from the specified location to a target hypervisor. If the image of the required OS is available in the TVM library, at block 716 the OS image is moved from the library to the target virtual machine. At block 718, when the operating system image is ready, the OS image load operation is scheduled on the provisioning scheduler, e.g., provisioning scheduler 416. The first thread/process then goes to block 728, depicted in FIG. 7C.

On the second (starting at block 713) thread/process, it is determined at block 719 whether the application prerequisites are available in the application prerequisites library, e.g., application prerequisites library 460. For an embodiment, the application prerequisites loader module, e.g., module 414, checks if the required application prerequisites packages are available in the application prerequisites library. If the application prerequisites are not found in the application prerequisites library, then the application prerequisites loader at block 721 locates the prerequisite packages using the input parameters, initiates the file transfer process, and moves the packages from the specified location to the target hypervisor. If the packages are available in the application prerequisites library, at block 723 the required application prerequisites packages are moved from the library to the target hypervisor. At block 722, when the application prerequisites packages are ready, the application prerequisites load operation is scheduled on the provisioning scheduler, e.g., provisioning scheduler 416. The second thread/process then goes to block 732, depicted in FIG. 7C.

On the third (starting at block 714) thread/process, it is determined at block 724 whether or not the application is already available in the application library, e.g., application package library 450. For an embodiment, the application loader module, e.g., application loader module 415, checks if the requested application packages are available in the application library. If the requested application packages are not found in the application library, at block 725, the application loader locates the packages using the input parameters, initiates the file transfer process, and moves the application packages from the specified location to the target hypervisor. If the application packages are found in the application library, at block 726, the packages are moved from the library to the target hypervisor. When the application is ready, the application load operation is scheduled on the provisioning scheduler, e.g., provisioning scheduler 416. The third thread/process then goes to block 734, depicted in FIG. 7C.

Figure 7C:
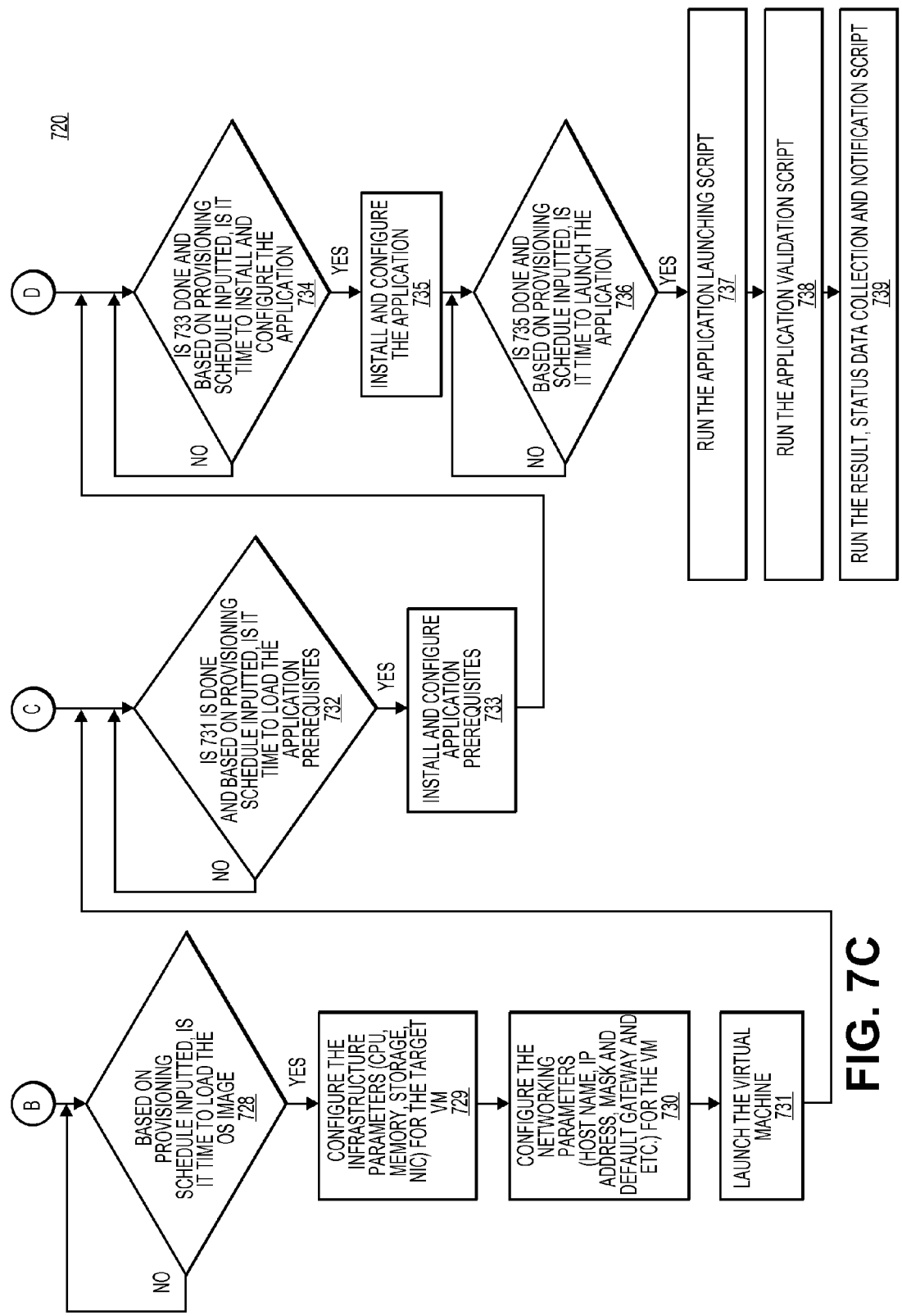
FIG. 7C shows a third portion of the exemplary embodiment of the method to provide remote application provisioning.

FIG. 7C shows a third portion 720 of the exemplary embodiment of the method 700 to provide remote application provisioning. On the first thread/process, at block 728 it is determined based on the provisioning schedule inputted whether or not it is time to load the OS image. For an embodiment, it is determined whether a time trigger is received from the provisioning schedule. If it is not time to load the OS image, the method 700 goes back to block 728.

If the scheduled time is met, at block 729 the infrastructure parameters such as CPU, Memory, Storage and Networking e.g., Network Interface Card ("NIC") are configured for the target virtual machine through the hypervisor's management interfaces or other third party tools, e.g., hypervisor controllers. Then at block 730 the network parameters, e.g., host name, IP address, Subnet Mask, default Gateway, and other network parameters are configured for the target VM through the hypervisor's management interfaces or other third party tools, e.g., hypervisor controllers. At block 731 the last operation of the first thread is performed that involves launching the virtual machine through the hypervisor's management interfaces or other third party tools, e.g., hypervisor controllers.

On the second thread/process at block 732 it is determined if the operation at block 731 has been completed (e.g., if the target virtual machine is up and running) and based on provisional schedule inputted, it is determined if it is time to load the application prerequisites. For an embodiment, it is determined if a time trigger from the provisioning schedule is received. If both the operation at block 731 has been completed and the scheduled time to load the application prerequisites is met, then at block 733 logging into the VM through one of the management interfaces, e.g., SSH interface, is performed, and the application prerequisites packages, e.g., shells, libraries, and other application prerequisite packages from local or remote repositories are installed and configured. If the operation at block 731 has not been completed or the scheduled time to load the application prerequisites is not met, method 700 returns back to block 732.

On the third thread, at block 734 it is determined if the operation at block 733 has been completed (e.g., if the application prerequisites are loaded), and based on provisioning schedule inputted, it is determined if it is time to install and configure the application. For one embodiment, it is determined if a time trigger is received from the provisioning scheduler. If the operation at block 733 has not been completed or the scheduled time to load the application is not met, method 700 returns back to block 734.

If both the operation at block 733 has been completed and the scheduled time to load the application is met, at block 735 logging in to the VM through one of the management interfaces, e.g., SSH interface, is performed, and the application packages from local or remote repositories are installed and configured.

At block 736 it is determined if the operation at block 735 is completed and based on provisioning schedule inputted, it is determined if it is time to launch the application. If the operation at block 735 has not been completed or the scheduled time to launch the application is not met, method 700 returns back to block 736. If both the operation at block 735 has been completed and the scheduled time to launch the application is met, at block 737 logging in the VM through one of the management interfaces (e.g., CLI, CUI, or application program interface) is performed and the application launching script is executed. For an embodiment, the application launching script starts the application and configures the necessary initial parameters for the proper functioning. For example, for a Web based application, the following operations can be performed: creating web server configuration, starting web server, deploying web application, configuring application filter rules, and other operations.

Then at block 738 the application validation script is executed. For an embodiment, the application validation script validates the successful execution of the application by performing basic acceptance tests. Then at block 739, the result, status data, and notification script are executed. For an embodiment, the application loader notifies the post processing engine, e.g., post processing engine 417, about the result of the application load task and then starts the overall application migration request ("AMR") result, status data collection, and notification script, which collects the logs on OS image, application prerequisites, application load process, and notifies the users specified in the AMR input parameters. For at least some embodiments, a system to provide an application provisioning over hypervisors as described herein comprises the following:

a. a mechanism that moves applications or packages instead of the whole operating system image to instantiate the virtual machine on a remote hypervisor;

b. a workflow automation of preparing the application in an automated manner to load as a virtual machine on the target hypervisor;

c. a template operating system library to create a target virtual machine through automation;

d. a template application prerequisites library to create a target virtual machine through automation; and e. a template applications library to create a target virtual machine through automation.

Figure 8A:
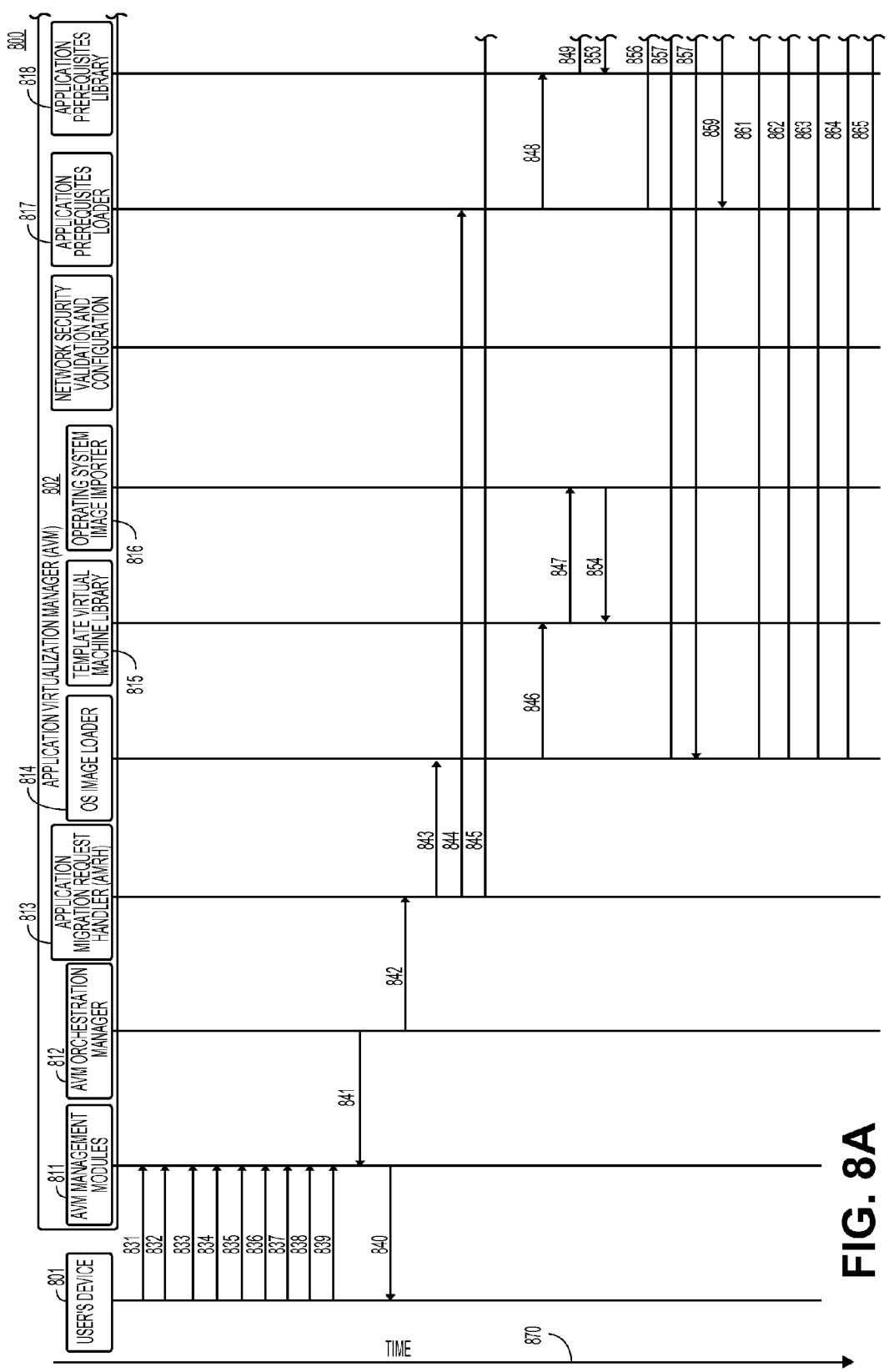
FIG. 8A is a first portion of an exemplary embodiment of a transaction diagram illustrating a method to provide a remote application provisioning over hypervisors.
Figure 8B:
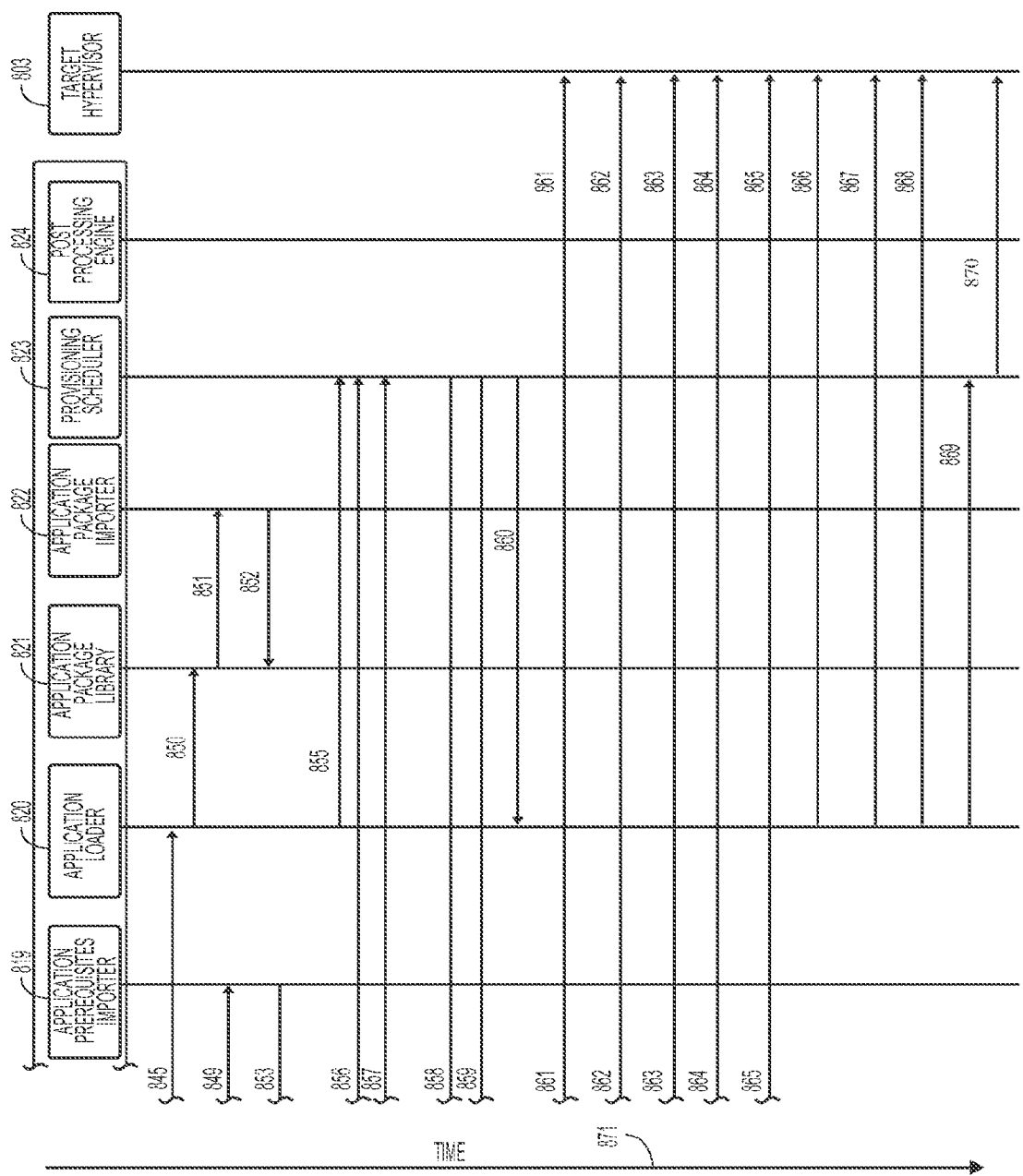
FIG. 8B is a second portion of an exemplary embodiment of a transaction diagram illustrating a method to provide a remote application provisioning over hypervisors.

FIG. 8A is a first portion of an exemplary embodiment of a transaction diagram along a time axis 870 illustrating a method to provide a remote application provisioning over hypervisors. FIG. 8B is a second portion of an exemplary embodiment of a transaction diagram along a time axis 871 illustrating a method to provide a remote application provisioning over hypervisors. For an embodiment, the time on axis 871 is after the time on axis 870. For an embodiment, the method begins with a user device 802 creating a management connection using one of the communication protocols (a transaction 831) with an AVM unit 802, as described above.

User device 802 inputs to AVM unit 802 application image transport parameters (a transaction 832), and application launch parameters (a transaction 833), as described above. User device 802 inputs to AVM unit 802 operating system parameters (a transaction 834), as described above. User device 802 inputs to AVM unit 802 networking parameters (a transaction 835), and security, infrastructure parameters (a transaction 836), as described above. User device 802 inputs to AVM unit 802 a provisioning schedule (a transaction 837) and application post-launch validation and notification parameters (a transaction 838), as described above. Depending on an embodiment, transactions 831-838 can be performed one after another as shown in the diagram 800, concurrently, or in any other order.

User device 802 creates an application migration request ("AMR") using all the input parameters and sends the AMR through the opened management connection to AVM unit 802 (a transaction 839), as described above. An AVM orchestration manager module 812 validates the AMR and passes an acknowledgement ("Ack") of the AMR to AVM management modules at a transaction 841. For an embodiment, the Ack contains the AMR validation status and error descriptions, if any.

AVM management module 811 sends the AMR Ack to the user device 801 on the management protocol chosen by the user (a transaction 840). After successful validation of the AMR, AVM orchestration manager module 812 sends the request to an application migration request handler ("AMRH") 813 (a transaction 842). AMRH 813 sends an image loading request to an OS image loader 814. AMRH 813 sends an application prerequisites loading request to an application prerequisites loader 817 at a transaction 844. AMRH 813 at a transaction 845 sends an application loading request to an application loader 819 depicted in FIG. 8B. OS image loader 814 at a transaction 846 checks the image availability in a template virtual machine library ("TVML") 815, as described above.

If the OS image is not available in the TVML 815, a request to locate the OS image using the input OS parameters and initiate the file transfer to the TVML 815 is sent to an operating system image importer 816 at a transaction 847. For an embodiment, TVML 815 is a target hypervisor's TVML. The requested image is sent at a transaction 854 from the OS image importer 816 to save in the TVML 815.

For an embodiment, concurrently with checking the OS image availability at transaction 846, an application prerequisites loader 817 checks the application prerequisites availability in an application prerequisites library ("APL") 818 at a transaction 848. If the application prerequisites are not available in the application prerequisites library 818, a request is sent to an application prerequisites importer 819 at a transaction 849 to locate the application prerequisites using the input application prerequisites parameters and to initiate the file transfer to the APL 818. For an embodiment, the APL 818 is a target hypervisor's APL. At a transaction 853 the located application prerequisites are sent from the application prerequisites importer to save in the APL 818.

For an embodiment, concurrently with checking the OS image availability at transaction 846, and checking the application prerequisites availability at transaction 848, an application loader 820 checks the application availability in an application package library ("AL") 821 at a transaction 850. If the application is not available in the AL 821, a request is sent to an application package importer 822 at a transaction 851 to locate the application using the input application parameters and to initiate the file transfer to the AL 821. For an embodiment, the AL 821 is a target hypervisor's AL. At a transaction 852 the located application is sent from the application importer 822 to save in the AL 821.

At a transaction 855, application loader 820 sends a request to a provisioning scheduler 823 to schedule the application installation based on the user's input application parameters. Application prerequisites loader 817 at a transaction 856 sends a request to provisioning scheduler 823 to schedule the application prerequisites installation based on the user's input application prerequisites parameters. OS image loader 814 at a transaction 857 sends a request to provisioning scheduler 823 to schedule the OS image loading based on the user's input OS image parameters.

At a transaction 858, the provisioning scheduler 823 sends a time trigger to configure and load the OS image to OS image loader 814. At a transaction 859 provisioning scheduler 823 sends a time trigger to install application prerequisites to application prerequisites loader 817. At a transaction 860 the provisioning scheduler 823 sends a time trigger to install and configure the application to application loader 820.

At a transaction 861, OS image loader 814 loads the OS image to a target hypervisor 803 through a controller API, user interface, or any other hypervisor specific methods. At a transaction 862 OS image loader 814 configures the infrastructure parameters (e.g., CPU, memory, storage, NIC) for the VM on target hypervisor 803. At a transaction 863 OS image loader 814 configures the networking parameters (e.g., host name, IP address, mask and default gateway, and other networking parameters) for the VM on target hypervisor 803. At a transaction 864, OS image loader 814 launches the VM on target hypervisor 803.

Application prerequisites loader 817 waits for OS image to be loaded and VM to be launched on the target hypervisor 803. After determining that the OS image has been loaded, and the VM has been created on the target hypervisor 803, the application prerequisites loader 817 installs and configures the application prerequisites on target hypervisor 803 at a transaction 865.

Application loader 820 waits until the OS image has been loaded, the VM has been launched, and the application prerequisites have been installed and configured, then application loader 820 installs and configures the application on target hypervisor over the created VM at a transaction 866. Then application loader 820 runs the application launching script on target hypervisor 803 at a transaction 867. Next, application loader 820 runs the application validation script on target hypervisor 803 at a transaction 868. At a transaction 869 application loader 820 sends a message to provisioning scheduler 823 to notify a post processing engine 824 about the ending of the application loading task. At a transaction 870 provisioning scheduler 823 runs the result, status data collection, and notification script to the data to target hypervisor 803.

Figure 9:
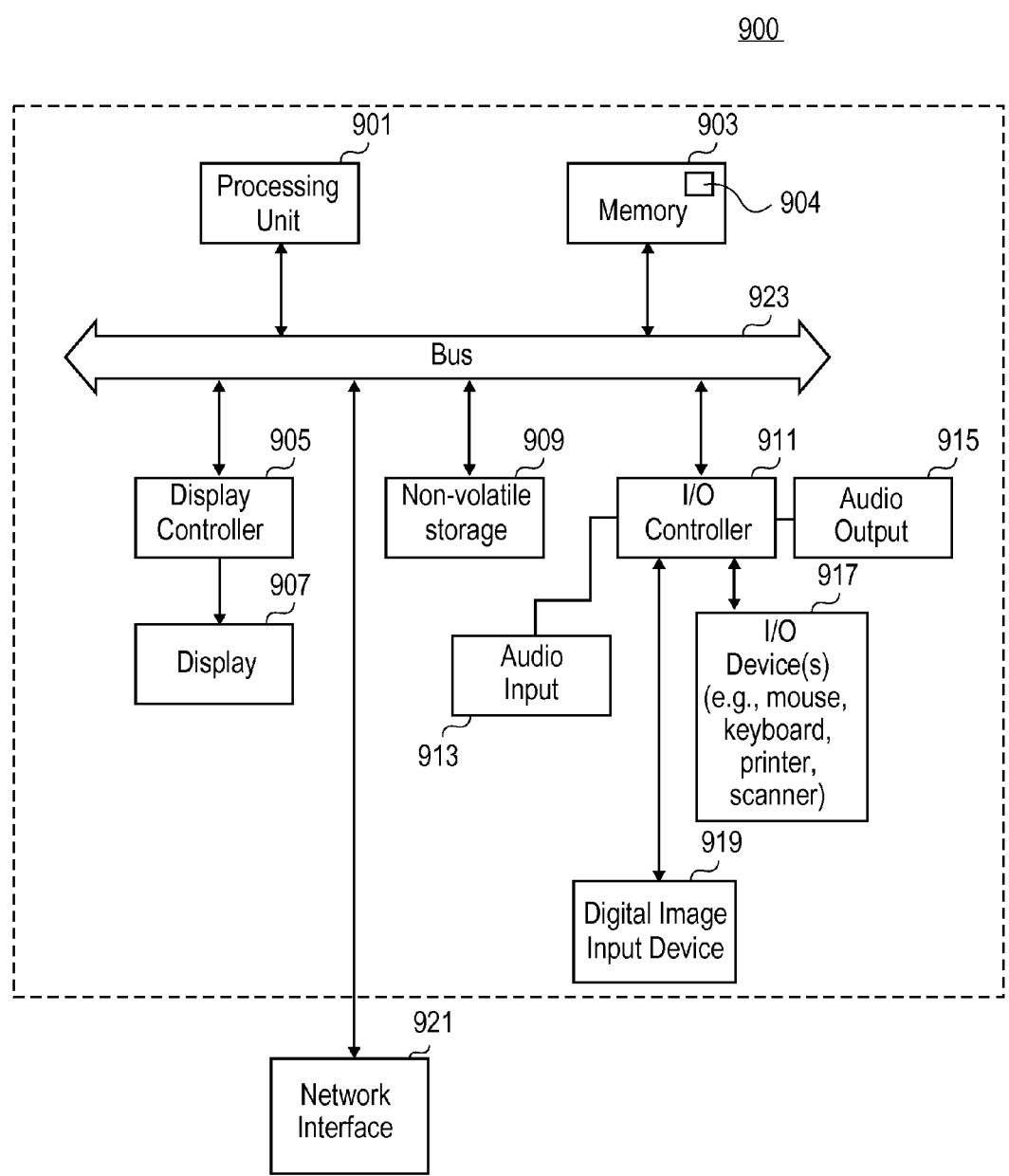
FIG. 9 shows a block diagram of one embodiment of a data processing system to provide remote application provisioning over hypervisors.

FIG. 9 shows a block diagram of one embodiment of a data processing system to provide remote application provisioning over hypervisors, as described herein. Data processing system 900 includes a processing unit 901 that may include a microprocessor or microprocessor, such as Intel microprocessor (e.g., Core i7, Core 2 Duo, Core 2 Quad, Atom), Sun Microsystems microprocessor (e.g., SPARC), IBM microprocessor (e.g., IBM 750), Motorola microprocessor (e.g., Motorola 68000), Advanced Micro Devices ("AMD") microprocessor, Texas Instrument microcontroller, and any other microprocessor or microcontroller.

Processing unit 901 may include a personal computer (PC), such as a Macintosh® (from Apple Inc. of Cupertino, Calif.), Windows®-based PC (from Microsoft Corporation of Redmond, Wash.), or one of a wide variety of hardware platforms that run the UNIX operating system or other operating systems. For at least some embodiments, processing unit 901 includes a general purpose or specific purpose data processing system based on Intel, AMD, Motorola, IBM, Sun Microsystems, IBM processor families, or any other processor families. As shown in FIG. 9, memory 903 is coupled to the processing unit 901 by a bus 923. Memory 903 has instructions and data 904 stored thereon which when accessed by processing unit 901 cause the processing unit 901 to perform remote application provisioning methods, as described herein.

Memory 903 can be dynamic random access memory ("DRAM") and can also include static random access memory ("SRAM"). A bus 923 couples processing unit 901 to the memory 903 and also to non-volatile storage 909 and to display controller 905 (if a display is used) and to the input/output (I/O) controller(s) 911. Display controller 905 controls in the conventional manner a display on a display device 907 which can be a cathode ray tube (CRT), liquid crystal display (LCD), or any other display device. The input/output devices 917 can include a keyboard, disk drives, printers, a scanner, a camera, and other input and output devices, including a mouse or other pointing device. The I/O controller 911 is coupled to one or more audio input devices 913, for example, one or more microphones.

The display controller 905 and the I/O controller 911 can be implemented with conventional well known technology. An audio output 915, for example, one or more speakers may be coupled to an I/O controller 911. The non-volatile storage 909 is often a magnetic hard disk, an optical disk, or another form of storage for large amounts of data. Some of this data is often written, by a direct memory access process, into memory 903 during execution of software in the data processing system 900 to perform methods described herein.

One of skilled in the art will immediately recognize that the terms "computer-readable medium" and "machine-readable medium" include any type of storage device that is accessible by the processing unit 901. A data processing system 900 can interface to external systems through a modem or network interface 921. It will be appreciated that the modem or network interface 921 can be considered to be part of the data processing system 900. This interface 921 can be an analog modem, ISDN modem, cable modem, token ring interface, satellite transmission interface, or other interfaces for coupling a data processing system to other data processing systems.

It will be appreciated that data processing system 900 is one example of many possible data processing systems which have different architectures. For example, personal computers based on an Intel microprocessor often have multiple buses, one of which can be an input/output (I/O) bus for the peripherals and one that directly connects the processing unit 901 and the memory 903 (often referred to as a memory bus). The buses are connected together through bridge components that perform any necessary translation due to differing bus protocols.

Network computers are another type of data processing system that can be used with the embodiments as described herein. Network computers do not usually include a hard disk or other mass storage, and the executable programs are loaded from a network connection into the memory 903 for execution by the processing unit 901. A typical data processing system will usually include at least a processor, memory, and a bus coupling the memory to the processor.

It will also be appreciated that the data processing system 900 can be controlled by operating system software which includes a file management system, such as a disk operating system, which is part of the operating system software. Operating system software can be the family of operating systems known as Macintosh® Operating System (Mac OS®) or Mac OS X® from Apple Inc. of Cupertino, Calif., or the family of operating systems known as Windows® from Microsoft Corporation of Redmond, Wash., and their associated file management systems. The file management system is typically stored in the non-volatile storage 909 and causes the processing unit 901 to execute the various acts required by the operating system to input and output data and to store data in memory, including storing files on the non-volatile storage 909.

In various embodiments, hardwired circuitry may be used in combination with software instructions to implement methods described herein. A non-transitory machine readable medium can be used to store software and data which when executed by a data processing system causes the system to perform various methods described herein. This executable software and data may be stored in various places including for example ROM, volatile RAM, non-volatile memory, and/or cache. Portions of this software and/or data may be stored in any one of these storage devices.

Thus, a machine readable medium includes any mechanism that provides (i.e., stores and/or transmits) information in a form accessible by a machine (e.g., a computer, network device, or any device with a set of one or more processors, etc.). For example, a machine readable medium includes recordable/non-recordable media (e.g., read only memory (ROM); random access memory (RAM); magnetic disk storage media; optical storage media; flash memory devices; and the like.

The methods as described herein can be implemented using dedicated hardware (e.g., using Field Programmable Gate Arrays, or Application Specific Integrated Circuit) or shared circuitry (e.g., microprocessors or microcontrollers) under control of program instructions stored in a machine readable medium. The methods as described herein can also be implemented as computer instructions for execution on a data processing system, such as system 900 of FIG. 9.

In the foregoing specification, embodiments as described herein have been described with reference to specific exemplary embodiments thereof. It will be evident that various modifications may be made thereto without departing from the broader spirit and scope of the embodiments as described herein. The specification and drawings are, accordingly, to be regarded in an illustrative sense rather than a restrictive sense.

What is claimed is:

1. A method to provide a remote application provisioning, comprising:
   receiving a request to move an application from a source device to a target device over a network;
   identifying an operating system image available on a target hypervisor on the target device based on the request;
   creating a target virtual machine using the identified operating system image for the application; and
   moving the application from the source device to the target virtual machine over the network.

2. The method of claim 1, further comprising
   determining if the operating system image is in a template virtual machine library on the target hypervisor; and
   moving the operating system image from the template virtual machine library to the target hypervisor, if the operating system image is in the template virtual machine library.

3. The method of claim 1, wherein creating the target virtual machine further comprises
   configuring the target virtual machine; and
   launching the target virtual machine.

4. The method of claim 1, further comprising
   determining application prerequisites in an application prerequisites library to move onto the target virtual machine.

5. The method of claim 1, further comprising
   determining the application in an application library to move to the target virtual machine.

6. The method of claim 1, further comprising
   configuring the application for the target virtual machine.

7. The method of claim 1, wherein the request comprises at least one of an application transport parameter, an application launch parameter; an operating system parameter; a networking parameter; a security parameter, an infrastructure parameter; a provisioning schedule data; and application post-launch validation and notification parameters.

8. A non-transitory machine-readable storage medium containing executable program instructions which when executed by a data processing system cause the system to provide an application provisioning over hypervisors, comprising:
   receiving a request to move an application from a source device to a target device over a network;
   identifying an operating system image available on a target hypervisor on the target device based on the request;
   creating a target virtual machine using the identified operating system image for the application; and
   moving the application from the source device to the target virtual machine over the network.

9. The non-transitory machine-readable medium of claim 8, further comprising instructions that cause the system to perform operations comprising:
   determining if the operating system image is in a template virtual machine library on the target hypervisor; and
   moving the operating system image from the template virtual machine library to the target hypervisor, if the operating system image is in the template virtual machine library.

10. The non-transitory machine-readable medium of claim 8, wherein creating the target virtual machine further comprises
    configuring the target virtual machine; and
    launching the target virtual machine.

11. The non-transitory machine-readable medium of claim 8, further comprising instructions to cause the data processing system to perform operations comprising determining application prerequisites in an application prerequisites library to move onto the target virtual machine.

12. The non-transitory machine-readable medium of claim 8, further comprising
    determining the application in an application library to move to the target virtual machine.

13. The non-transitory machine-readable medium of claim 8, further comprising
    configuring the application for the target virtual machine.

14. The non-transitory machine-readable medium of claim 8, wherein the request comprises at least one of an application transport parameter, an application launch parameter; an operating system parameter; a networking parameter; a security parameter, an infrastructure parameter; a provisioning schedule data; and application post-launch validation and notification parameters.

15. A data processing system to provide an application provisioning over hypervisors, comprising:
    a memory; and
    an application virtualization manager unit comprising a processor coupled to the memory, the processor to receive a request to move an application from a source device to a target device over a network, the processor to identify an operating system image available on a target hypervisor on the target device based on the request;
    the processor to create a target virtual machine using the identified operating system image for the application; and the processor to move the application from the source to the target virtual machine over the network.

16. The data processing system of claim 15, wherein the processor is to determine if the operating system image is a template virtual machine library on the target hypervisor; and to move the operating system image from the template virtual machine library to the target hypervisor, if the operating system image is in the template virtual machine library.

17. The data processing system of claim 15, wherein the processor is to configure the target virtual machine; and to launch the target virtual machine.

18. The data processing system of claim 15, wherein the processor is further configured to identify application prerequisites in an application prerequisites library to move onto the target virtual machine.

19. The data processing system of claim 15, wherein the processor is to identify the application in an application library to move to the target virtual machine.

20. The data processing system of claim 15, wherein the processor is to configure the application for the target virtual machine.

21. The data processing system of claim 15, wherein the request comprises at least one of an application transport parameter, an application launch parameter; an operating system parameter; a networking parameter; a security parameter, an infrastructure parameter; a provisioning schedule data; and application post-launch validation and notification parameters.

22. The data processing system of claim 15, wherein the application virtualization manager unit is configured to operate over a host operating system based hypervisor.

23. The data processing system of claim 15, wherein the application virtualization manager unit is configured to operate on a guest virtual machine over a bare metal hypervisor.

24. The data processing system of claim 15, wherein the application virtualization manager unit is configured to operate alongside of a hypervisor on a host operating system.

25. The data processing system of claim 15, wherein the application virtualization manager unit is configured to operate directly on a hardware.

26. The data processing system of claim 15, wherein the application virtualization manager unit is configured to operate as a part of a bare metal hypervisor.

27. The data processing system of claim 15, wherein the application virtualization manager unit is configured to operate as a part of a host operating system based hypervisor.

28. The data processing system of claim 15, further comprising one or more management interfaces to connect to a user device.

29. The data processing system of claim 15, further comprising the application prerequisites library coupled to the memory.

30. The data processing system of claim 15, further comprising the application library coupled to the memory.

31. The data processing system of claim 15, wherein the application virtualization manager unit is configured to operate in a centralized manner from a single device.

32. The data processing system of claim 15, wherein the application virtualization manager unit is configured to operate in a distributed manner from a plurality of devices.

* * * * *